(12) United States Patent
Grimanis et al.

(10) Patent No.: US 10,473,221 B2
(45) Date of Patent: Nov. 12, 2019

(54) MATRIX SPLIT ROTARY SEAL

(71) Applicant: A.W. CHESTERTON COMPANY, Woburn, MA (US)

(72) Inventors: Michael P. Grimanis, Wayland, MA (US); Joseph K. Kaleshian, Burlington, MA (US); Thomas Richard, Peabody, MA (US)

(73) Assignee: A.W. CHESTERTON COMPANY, Groveland, MA (US)

(*) Notice: Subject to any disclaimer, the term of this patent is extended or adjusted under 35 U.S.C. 154(b) by 0 days.

(21) Appl. No.: 13/853,539

(22) Filed: Mar. 29, 2013

(65) Prior Publication Data
US 2014/0291936 A1 Oct. 2, 2014

(51) Int. Cl.
F16J 15/34 (2006.01)
F16J 15/3208 (2016.01)
F16J 15/3216 (2016.01)
F16J 15/3252 (2016.01)
F16J 15/3272 (2016.01)
F16J 15/3276 (2016.01)

(52) U.S. Cl.
CPC ......... *F16J 15/348* (2013.01); *F16J 15/3208* (2013.01); *F16J 15/3216* (2013.01); *F16J 15/3252* (2013.01); *F16J 15/3272* (2013.01); *F16J 15/3276* (2013.01)

(58) Field of Classification Search
CPC ........ F16J 15/441; F16J 15/164; F16J 15/003; F16J 15/005; F16J 15/348; F16J 15/3484; F16J 15/3204; F16J 15/3208; F16J 15/3216; F16J 15/3252; F16J 15/3272; F16J 15/3276; F16J 15/3268; F01D 11/003; F01D 11/005

USPC .......................................................... 277/579
See application file for complete search history.

(56) References Cited

U.S. PATENT DOCUMENTS 1,381,993 A * 6/1921 Hill ............................ F16J 9/20
277/447
3,288,164 A * 11/1966 Clark ...................... F16J 15/064
137/320
4,890,937 A * 1/1990 Balsells ......................... 384/16
(Continued)

FOREIGN PATENT DOCUMENTS

DE 102012009189 A1 2/2013
EP 1043525 A2 10/2000
WO 2012/080027 A1 6/2012

OTHER PUBLICATIONS

International Search Report and Written Opinion for Application No. PCT/US2014/032017, 11 pages, dated Jul. 22, 2014.

*Primary Examiner* — Nathan Cumar
(74) *Attorney, Agent, or Firm* — Nelson Mullins Riley & Scarborough LLP; Anthony A. Laurentano

(57) ABSTRACT

The present invention provides a rotary seal assembly for providing sealing on a rotating shaft or other suitable device. The seal assembly seals against a rotating shaft or other piece of moving equipment to prevent the leakage of fluids. In some embodiments, a split rotary seal assembly employing an energizer, housing, and a rotational seal element such as a matrix is provided. The energizer energizes the matrix to enhance the sealing properties of the assembly. Furthermore, the matrix conforms to the surface of the shaft, and moves radially with the shaft to provide an effective seal in high wear or runout applications.

39 Claims, 30 Drawing Sheets

(56) References Cited

U.S. PATENT DOCUMENTS

| | | | | |
|---|---|---|---|---|
| 5,472,216 A | * | 12/1995 | Albertson et al. | 277/530 |
| 5,984,316 A | | 11/1999 | Balsells | |
| 6,217,029 B1 | | 4/2001 | Weiler | |
| 6,561,520 B2 | * | 5/2003 | Kalsi | F16J 15/3244 277/500 |
| 7,883,094 B2 | * | 2/2011 | Vila | F16J 15/3212 277/508 |
| 2004/0129018 A1 | * | 7/2004 | Rini | F04C 18/22 62/507 |
| 2006/0006605 A1 | * | 1/2006 | Grimanis | F16J 15/3224 277/500 |
| 2007/0090605 A1 | * | 4/2007 | Grimanis | F16J 15/36 277/370 |
| 2007/0267819 A1 | * | 11/2007 | Azibert et al. | 277/370 |
| 2008/0283236 A1 | * | 11/2008 | Akers et al. | 166/105 |
| 2009/0146379 A1 | | 6/2009 | Foster et al. | |
| 2010/0206162 A1 | * | 8/2010 | Blue | 92/165 R |

\* cited by examiner

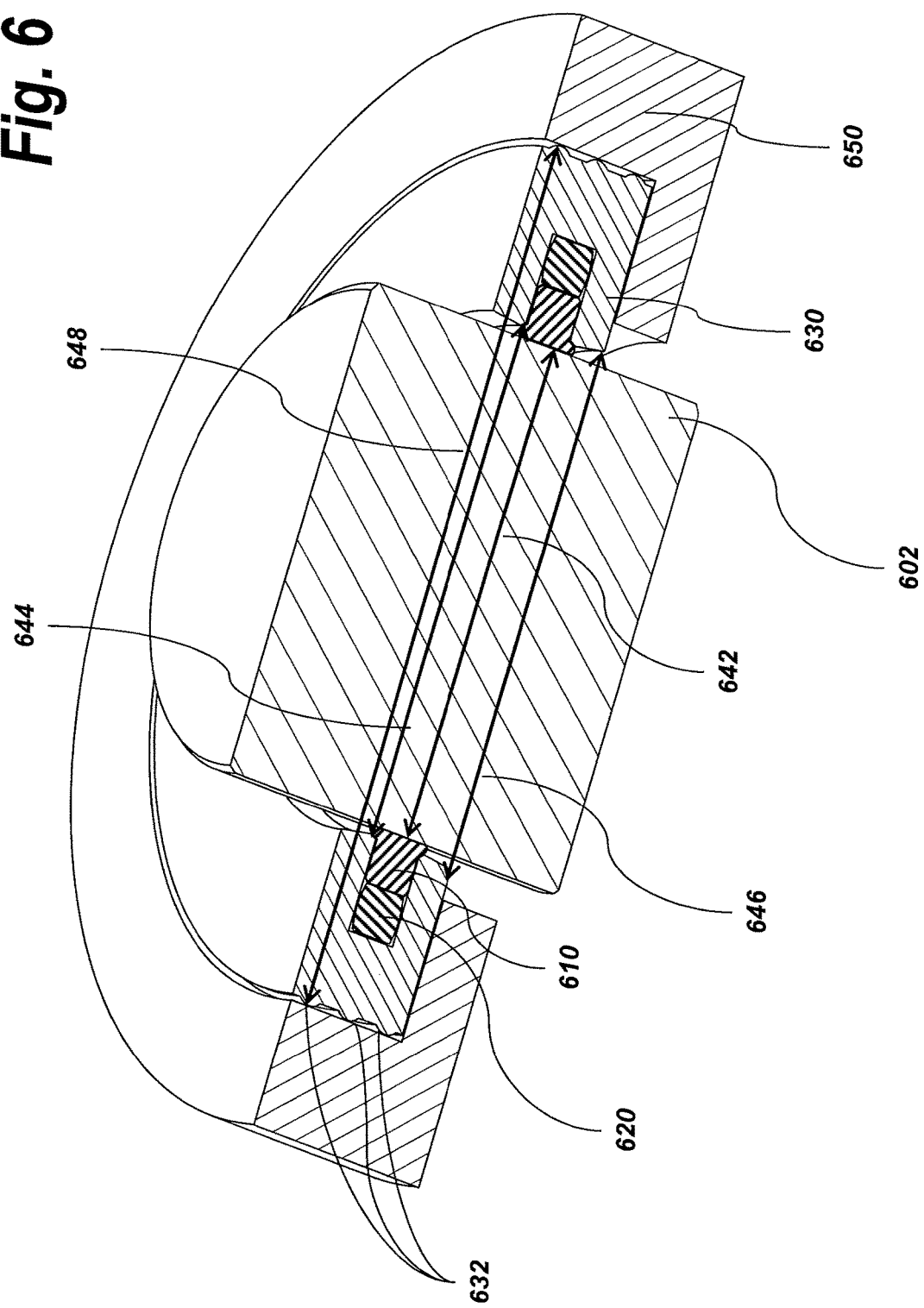

MATRIX SPLIT ROTARY SEAL

FIELD OF THE INVENTION

The present invention relates to a seal assembly for sealing a shaft or a rod relative to a stationary component. This invention relates generally to polymer or rubber based rotary seals. More particularly, the present invention relates to matrix split rotary seals that provide strong sealing capabilities on worn and degraded surfaces under a variety of operating conditions.

BACKGROUND

Conventional rotary seals are employed in a wide variety of environments and settings, such as for example, in mechanical apparatuses, to provide a fluid-tight seal. The sealing assemblies are usually positioned about a rotating shaft or rod that is mounted in and protrudes from a stationary mechanical housing. Polymer or rubber seals are generally not present in split configurations.

A seal may be deployed upon equipment. As the equipment ages, several problems may develop. For example, as a rotating shaft ages, the radially outer surface of the shaft (i.e., the surface of the shaft presented to the sealing surface of the seal) may become inconsistent, pitted, pocked, damaged, or otherwise made uneven. If the sealing surface of a seal assembly cannot conform to the uneven surface of the shaft, the seal assembly will not be capable of maintaining a tight seal with the shaft.

Furthermore, the shaft may not be rotating perfectly concentrically within the equipment. For example, the centerline of the equipment bore and the shaft may not be coincident during operation. The concentricity of the shaft is indicated by the Total Indicated Runout (TIR) of the shaft. In real-world applications, the TIR of a shaft is typically not zero; that is, the shaft will move radially towards and away from the seal as the shaft rotates. If the seal is unable to move radially with the shaft, the sealing performance of the seal assembly is degraded. As a result, many conventional seals do not perform adequately and wear out prematurely.

The present application addresses these and other problems, as described in more detail below.

SUMMARY

The present invention is generally directed to a split rotary seal assembly employing an energizer, housing, and a rotational seal element such as a matrix. The seal assembly seals against a rotating shaft or other piece of moving equipment to prevent the leakage of petroleum and synthetic oil, grease, and other fluids.

In the presently described sealing assembly, the matrix and energizer may move and deform. Due to combined movement of energizer and matrix, the matrix follows shaft in radial displacements. Thus, the matrix moves radially in/out within the housing to follow the shaft, even though the shaft may not be rotating concentrically within the equipment. As the sealing element follows the shaft runout, the surfaces of the matrix that are perpendicular to the shaft maintain a leakfree interface with the inside channel walls of the housing.

Furthermore, due to the nature of the presently described matrix, the matrix will comply with inconsistent or damaged surfaces within older equipment, but will not wear excessively due to abrasion resistance. Accordingly, the matrix provides an effective seal on worn or degraded shaft surfaces, while still maintaining sealing capability on new surfaces.

According to one embodiment an annular rotary seal assembly, and a method of fabricating an annular rotary seal assembly, are provided. The annular rotary seal assembly may include a housing having a radially interior inside channel defined at least in part by an interior axially extending wall. The housing may be formed from elastomer, plastic, polyeurethane, or metal. The radially interior inside channel may include an interior axially extending wall and two interior substantially radially extending walls.

The housing may further include a radially inner first slanted wall extending from one of the interior substantially radially extending walls to a meeting point, and a radially inner second slanted wall extends from the meeting point to a radially extending exterior wall of the housing, the radially inner first slanted wall and the radially inner second slanted wall being slanted away from the axial direction at different angles. The first and second slanted walls may serve to prevent a sealing element (such as a matrix) disposed in the radially interior inside channel from rotating.

The housing may also include one or more static sealing elements provided on a radially outer surface of the housing. The one or more static sealing elements may be integral with the housing, or may be provided in a radially exterior outside channel of the housing. The static sealing element may be an O-ring.

The annular rotary seal assembly may further include a matrix provided substantially within the radially interior inside channel of the housing and protruding from the radially interior inside channel. The matrix may have a radially inner surface for sealing against the equipment. The matrix may include composite reinforced fibers or yarns and one or more lubricants. The fibers or yarns may be carbon, aramid, rayon, kynol, Kevlar, cotton, and polytetrafluoroethylene (PTFE) fibers or yarns. The fibers may be woven or braided. The lubricants may include carbon, graphite, and PTFE based lubricants.

The matrix may have an inner diameter and the housing has an inner diameter defined at the radially innermost point of the housing, and the inner diameter of the matrix is less than the inner diameter of the housing. In this way, a portion of the matrix may extend beyond the housing, thereby preventing the housing from coming into contact with the rotating shaft.

The annular rotary seal assembly may further include an energizer for providing a radial force to the matrix. The energizer may be made up of elastomer, foam, silicone, fluorocarbons, ethylene propylene diene Monomer (M-class) rubber (EPDM), nytrile, a sponge, or a metallic spring.

The energizer may be disposed in the radially interior inside channel of the housing between the matrix and the interior axially extending wall in the radial direction. The energizer may press against the interior walls of the radially interior inside channel when compressed.

The energizer may be selected to be less rigid than the matrix, and furthermore may be selected to have a resistive force of 0.5-10 lbs/in.

One or more of the housing, the matrix and the energizer may have two ends and comprise a split separating the two ends. Further, at least one of the energizer and the matrix is in the form of a cord. By forming the energizer or matrix in the form of a cord, the energizer or matrix can be easily split. Providing a split may serve to ease installation.

Other exemplary embodiments provide a pressure actuation passage for introducing a process fluid at a higher than ambient pressure for energizing the matrix. The pressure actuation passage may be provided in a radially extending side of the housing and may extend into the radially interior inside channel at a location lateral to the energizer. The pressure actuation passage allows for additional sealing force to be applied to the matrix, further enhancing the assembly's sealing properties.

In some exemplary embodiments, an anti-rotational element is provided for preventing the matrix from rotating, the anti-rotational element extending through the housing and energizer and into the matrix. The anti-rotational element may be a pin or a screw inserted through the housing in a radial direction. In some embodiments, the anti-rotational element may be inserted into a thru-hole in the housing, and the thru-hole may permit radial movement of the anti-rotational element. The amount of radial movement permitted may be controlled by a sleeve.

In another configuration, a unitized housing made from an elastomer material (i.e. polyurethane) is provided. Thinner sections of the body allow flexure for radial movement and simultaneously provide anti-rotation for the matrix.

In yet further embodiments, a fluid leakage collecting channel may be provided for collecting fluid from the equipment.

These and other features and advantages of the present invention will be more fully understood by reference to the following detailed description in conjunction with the attached drawings in which like reference numerals refer to like elements through the different views. The drawings illustrate principals of the invention and, although not to scale, show relative dimensions.

DESCRIPTION OF THE FIGURES

FIG. 6 is a cross-sectional perspective view of a matrix split rotary seal according to a second embodiment of the invention.

DETAILED DESCRIPTION

Figure 1:
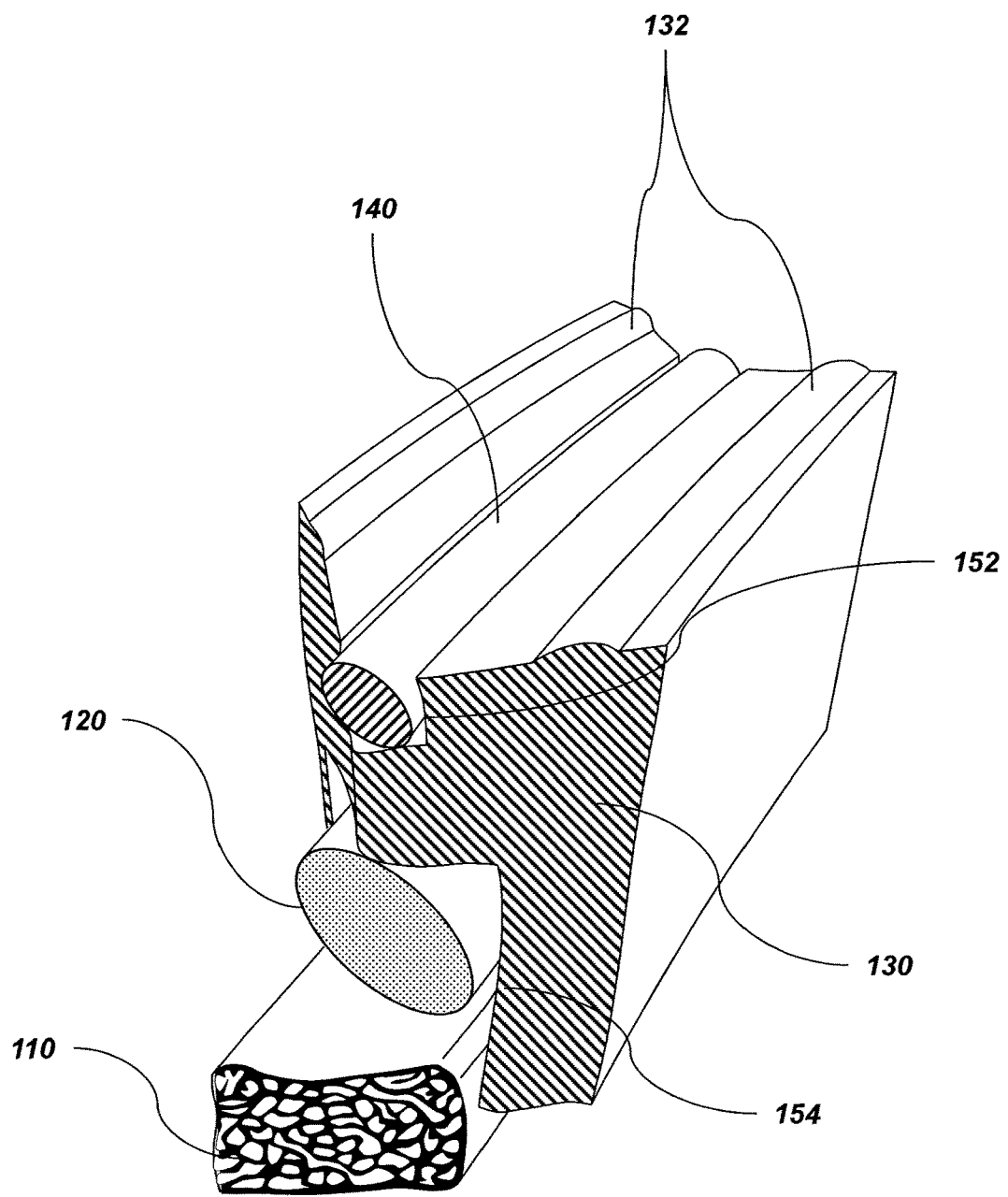
FIG. 1 is a close-up cross-sectional perspective view of a matrix split rotary seal assembly according to an illustrative embodiment of the invention.

The present invention provides a mechanical seal assembly for providing sealing on a rotating shaft or other suitable device. The invention will be described below relative to illustrated embodiments. Those skilled in the art will appreciate that the present invention may be implemented in a number of different applications and embodiments and is not specifically limited in its application to the particular embodiment depicted herein.

In some embodiments, a split rotary seal assembly employing an energizer, housing, and a rotational seal element such as a matrix is provided. The seal assembly seals against a rotating shaft or other piece of moving equipment to prevent the leakage of petroleum and synthetic oil, grease, and other fluids.

Exemplary embodiments of a matrix split rotary seal assembly according to the present invention are useful for sealing against surfaces rotating at a low to a high speed and at a variety of pressure conditions, from vacuum to a high pressure differential across the seal. Exemplary embodiments are suitable for high shaft runout applications, because the matrix follows the shaft in radial displacements. Further, because the matrix conforms to the surface of the rotating shaft, the presently described matrix split rotary seal is effective on worn or degraded shaft surfaces. Ease of installation is facilitated due to a split formed in the housing, energizer, and matrix, although the assembly may be solid in some embodiments.

In some embodiments, a pressure actuating feature is provided in the housing. Accordingly, additional pressure may be provided to the matrix and the energizer to further enhance the sealing capabilities of the seal assembly. In other embodiments, an anti-rotational mechanism is provided to prevent the matrix from rotating with the shaft.

Exemplary embodiments of the present invention are particularly useful for large diameter rotating shafts (e.g., 15"-50") with a long lifespan or high speed or wear characteristics, such as those found on wind turbines. However, the present invention is not so limited, and may be equally employed on smaller shafts or other surfaces. Further, although exemplary embodiments are described as sealing against a rotating shaft, one of ordinary skill in the art will recognize that the present invention is not so limited, and may be employed with any suitable sealing surface.

Exemplary embodiments of the present invention will be described with reference to the following terms.

The terms "seal assembly" and "sealing assembly" as used herein are intended to include various types of sealing assemblies, including single seals, split seals, concentric seals, spiral seals, and other known seal and sealing assembly types and configurations.

The term "shaft" is intended to refer to any suitable device in a mechanical system to which a seal can be mounted and includes shafts, rods and other known devices.

The terms "axial" and "axially" used herein refer to a direction generally parallel to the axis of a shaft. The terms "radial" and "radially" used herein refer to a direction generally perpendicular to the axis of a shaft, in a direction away from the center of the shaft. The terms "fluid" and "fluids" refer to liquids, gases, and combinations thereof.

The term "radially inner" as used herein refers to the portion of the seal assembly proximate a shaft. Conversely, the term "radially outer" as used herein refers to the portion of the seal assembly distal from a shaft.

The terms "stationary equipment", "static surface" and "gland" as used herein are intended to include any suitable stationary structure housing a shaft or rod to which a seal is secured.

The phrase "ambient environment" or "ambient pressure" is intended to include any external environment or pressure other than the internal environment of the housing of the seal assembly.

The present invention will be better understood with reference to the exemplary embodiments depicted in the attached Figures.

FIG. 1 is a close-up cross-sectional perspective view of a matrix split rotary seal assembly 100 according to an illustrative embodiment of the invention. As shown in FIG. 1, a matrix 110 or other rotational sealing element is provided on the radially interior side of the matrix split rotary seal assembly 100. The matrix 110 forms a dynamic sealing element made up of a composite reinforced fiber impregnated with one or more lubricants. The matrix may be formed directly into the radially interior inside channel 154 of the housing 130.

The matrix 110 is not generally a stiff solid material. It may be a material with a large percentage (by weight and volume) of fibers and yarn combined with lubricants or polymer based dispersions. The composite reinforced fiber of the matrix 110 may be a natural or synthetic fiber. Suitable fibers include, but are not limited to, one or a combination of carbon, aramid, rayon, kynol, Kevlar, cotton, and polytetrafluoroethylene (PTFE) fibers or yarns. The inventors have generally found that the robust nature of fiber reinforcement is superior as compared with sintered PTFE and rubber compounds. The fibers may be woven or braided in a textile fashion. The lubricants of the matrix 110 may include carbon, graphite, PTFE, or other lubricants.

Accordingly, the matrix 110 provides the enhanced benefits of low friction materials with the high strength of a composite with high tensile strength fiber reinforcement. This combination provides for high pressure-velocity (PV) running characteristics operating on a rotating shaft. Due to the matrix's 110 flexibility resistance, the matrix 110 will comply with inconsistent or damaged surfaces within older equipment, but will not wear excessively due to abrasion resistance.

The matrix 110 can meld to conform to both small and relatively large imperfections in the counter-sealing surface of a rotating shaft, as might be found on an old or worn shaft. This alleviates the need to repair, replace, or reconstruct equipment, while still providing sealing properties against new surfaces.

The matrix 110 may be in cord form. By providing the matrix 110 in cord form, the matrix 110 may easily be provided in a split configuration, making the matrix 110 conducive for use with small to very large diameter equipment. If the matrix 110 is split with a skieve cut, the matrix 110 can be easily re-assembled.

The matrix 110 may be formed in different cross-sectional geometries. Suitable geometries may include a square, rectangle, trapezoid, and other sealing element geometries that will be familiar to one of ordinary skill in the art.

An energizer 120 is provided between the matrix 110 and a portion of the housing 130, and provides a seal force to the matrix 110 which is directed in a radially inward direction. The energizer may be made from elastomer, closed foam elastomer, other foams, silicone, fluorocarbons, ethylene propylene diene Monomer (M-class) rubber (EPDM), nytrile, a sponge, or a metallic spring. For example, the energizer may be made from a 50 A durometer material.

The energizer material and shape is selected to have appropriate stress/strain characteristics. In general, the energizer has a spring constant which dictates how much sealing force is applied to the matrix. The energizer optimally applies a spring load of 1 lb/in, although spring loads in the range of 0.5-10 lb/in are also suitable for exemplary embodiments of the present invention.

The energizer should generally be selected to be less rigid than the matrix so that the energizer deforms before the matrix. At the same stress level, the strain on the energizer should typically be an order of magnitude or more higher than the matrix.

The energizer 120 may be provided in cord form so that the energizer 120 may be easily placed within the radially interior inside channel 154 of the housing 130, and so that the energizer 120 may be easily split. The energizer may have a generally cylindrical shape that is circular in cross-section, although other geometric shapes are also suitable for embodiments of the present invention.

The seal force applied to the matrix 110 by the energizer 120 can be varied by using energizer materials of different hardness and foams with different densities. The range of deflection within these materials will also dictate the load force applied.

The matrix 110 and energizer 120 are supported in a housing 130. The housing 130 is an integrated component that fits directly into equipment. The housing 130 is an annular body with an inside diameter channel. The housing 130 may be formed from elastomer, plastic, polyeurethane, or metal. The housing 130 should generally be rigid enough to act as a housing for the other components of the seal assembly, but should be flexible enough to be split and wrapped around a rotating shaft.

The housing 130 may generally have an "H" shape in cross-section. The cross-sectional shape of the housing 130 may be formed by providing a radially exterior outside channel 152, and a radially interior inside channel 154. The radially interior inside channel 154 accommodates the matrix 110 and the energizer 120, while the radially exterior outside channel 152 may accommodate one or more static sealing surfaces. The radially exterior outside channel 152 is not necessarily provided in all embodiments.

Static sealing surfaces are provided on the outside diameter of the housing 130. The static sealing surfaces may be integral with, or formed as a part of, the housing 130, as in the case of the housing integral static sealing surfaces 132.

Alternatively, a separate static sealing element 140, such as an O-ring, gasket, or other sealing element may be provided and may be supported in the radially exterior outside channel 152 of the housing, or by grooves in the housing.

The integral static sealing surfaces 132 may also be employed in combination with one or more separate static sealing elements 140. Whether to provide integral or non-integral static sealing elements is dependent upon the particular application for the sealing assembly 100. For example, if anti-rotational screws or pins are provided (see FIGS. 11A-11C and 12, described below), a non-integral static sealing element may be used to cover the proximal end of the anti-rotational element. On the other hand, integrally-formed static sealing elements may be less expensive to produce and simpler to deploy than non-integral static sealing elements.

Generally, the matrix 110 and energizer 120 are provided in a radially interior inside channel 154 of the housing 130. The matrix 110 is provided at the most radially interior location of the assembly 100 and faces a rotating shaft to provide sealing against the shaft. The energizer 120 is situated between the matrix 110 and an axially extending wall of the radially interior inside channel 154 in the radial direction.

Figure 2:
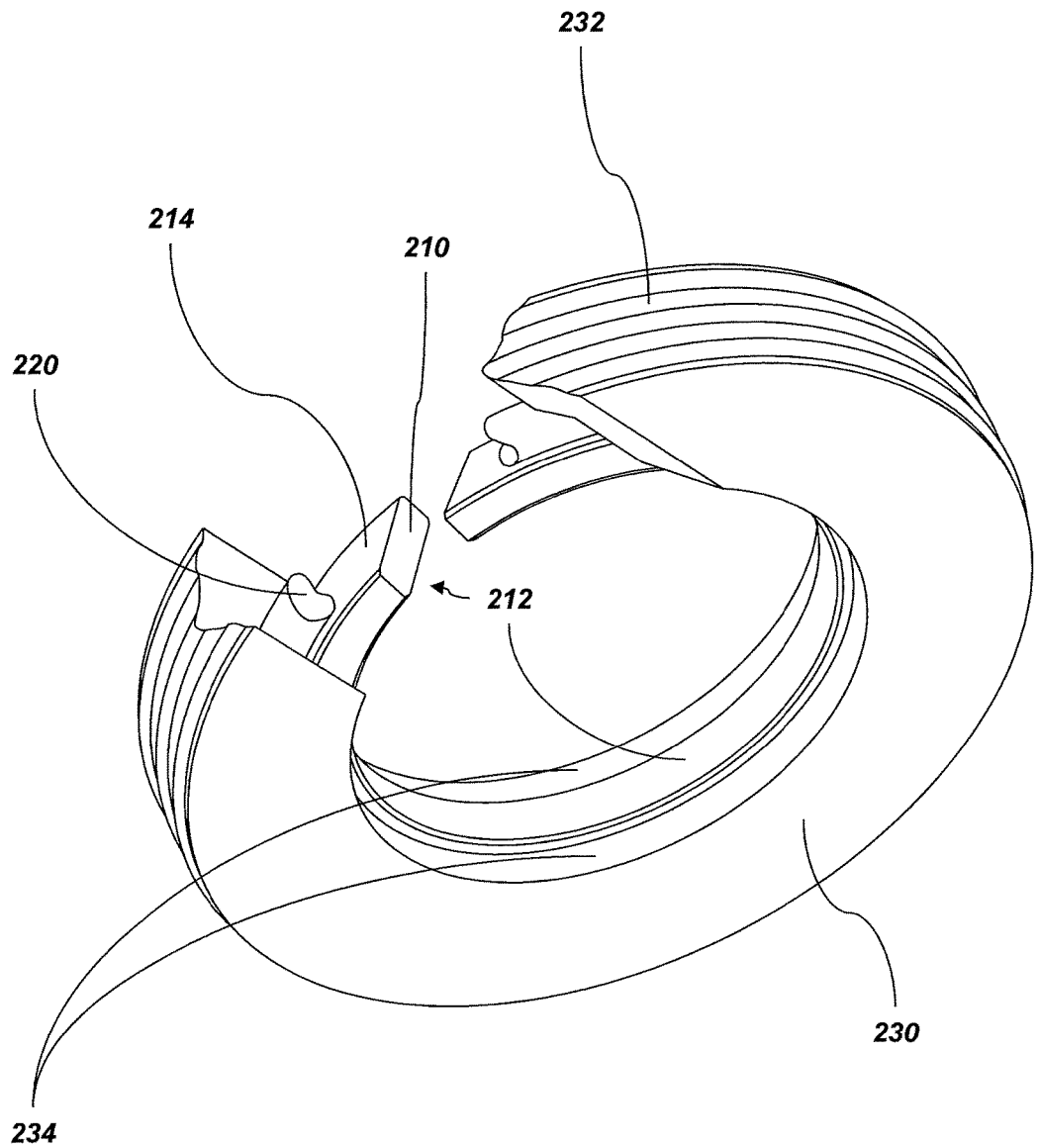
FIG. 2 is a cutaway perspective view depicting a housing, an energizer, and a matrix of an exemplary matrix split rotary seal assembly according to the present invention.

The manner in which these sealing elements fit together to form an annular assembly is shown in FIG. 2. FIG. 2 is a cutaway perspective view depicting an exemplary matrix split rotary seal assembly 200 having a matrix 210, an energizer 220, and a housing 230.

As shown in FIG. 2, a radially inner matrix surface 212 is provided at a radially-innermost portion of the seal assembly. The radially inner matrix surface 212 faces towards the radial center of the seal assembly and contacts a rotating shaft (or other piece of equipment) to provide a sealing surface of the assembly 200. The radially inner matrix surface 212 is typically a flat surface, although the shape of the radially inner matrix surface 212 will vary depending on the shape of the matrix 210.

A radially outer matrix surface 214 is provided on the opposite end of the matrix 210 from the radially inner matrix surface 212. The radially outer matrix surface 214 faces the energizer 220. During operation, the energizer 220 may be compressed so that at least a portion of the energizer 220 presses against the radially outer matrix surface 214. Accordingly, the matrix is energized and a radially directed sealing force may be applied.

The housing 230 includes a radially outer housing surface 232. The radially outer housing surface 232 faces a static surface and accommodates one or more static sealing elements. Thus, the radially outer housing surface 323 may establish a seal against the static sealing surface.

The housing 230 additionally has a radially inner housing surface 234 The radially inner housing surface 234 may be provided with one or more slanted surfaces in order to secure the matrix 210 during operation, so that the matrix 210 does not rotate with a rotating shaft. The slanted surfaces are described in more detail with respect to FIG. 7E.

The radially inner matrix surface 212 protrudes from the radially inner housing surface 234 towards the radial center of the assembly 200. As will be discussed in more detail below with respect to FIG. 8, by allowing the matrix 210 to extend beyond the end of the housing 230, the ends of the matrix 210 will be compressed between the housing 230 and a rotating shaft around which the seal assembly 200 is disposed. This prevents the housing 230 from making contact with the rotating shaft in operation.

Figure 3:
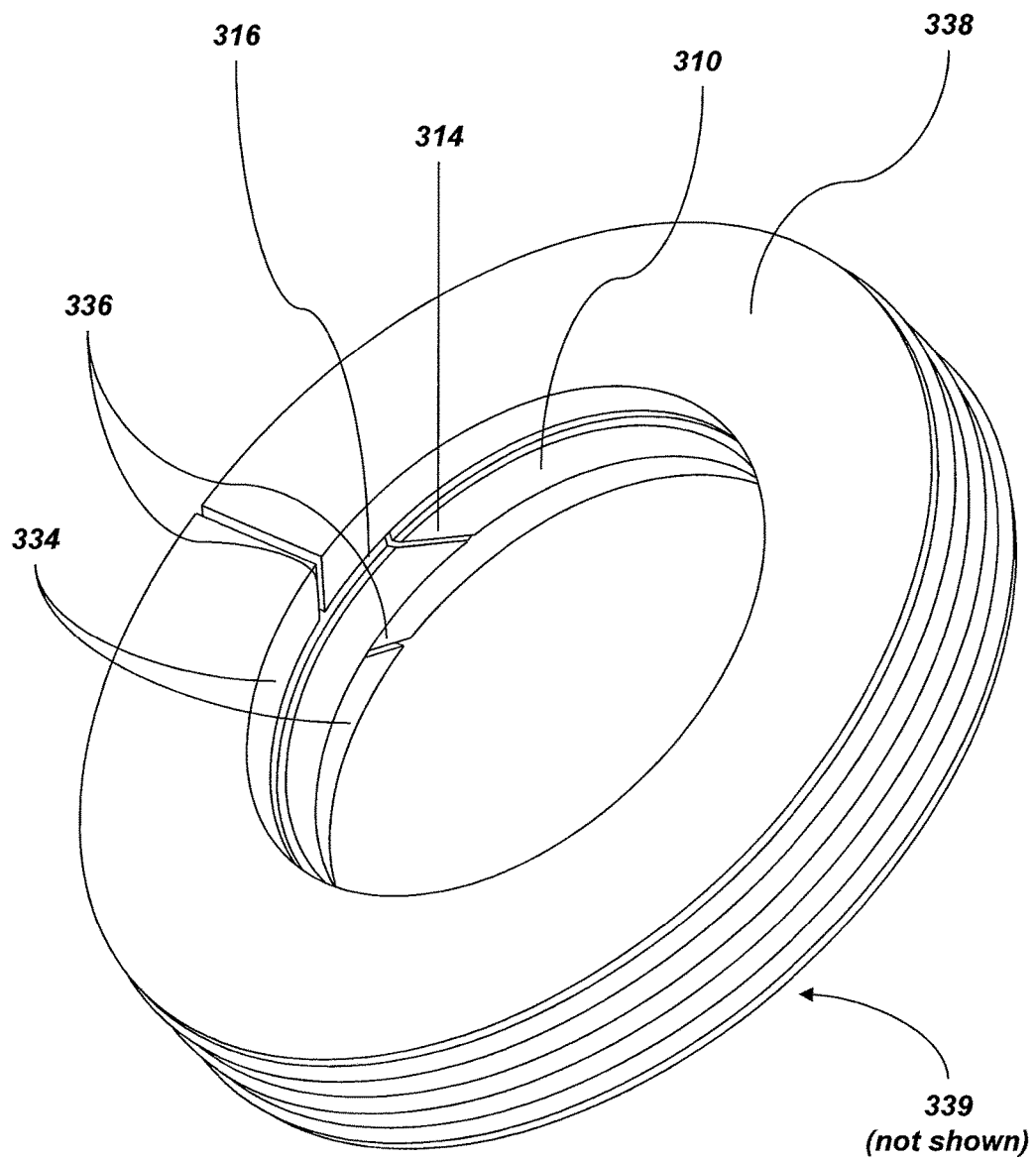
FIG. 3 is a perspective view of a matrix split rotary seal assembly according to an illustrative embodiment of the invention.

FIG. 3 is a perspective view of an assembled matrix split rotary seal assembly 300 according to an illustrative embodiment of the invention. The matrix 310 is split at a matrix split 314. This facilitates ease of installation of the matrix 310 about a rotating shaft. Furthermore, as noted above the matrix extends radially beyond the radially inner end 334 of the housing, exposing a matrix side portion 316. During operation, this side portion 316 is compressed and disposed between the housing radially inner surface 334 and a rotating shaft.

The housing is split at a housing split 336. The housing split 336 is provided to facilitate ease of installation. In some embodiments, the housing split 336 provides other advantages, such as preventing misalignment and allowing system pressure to enhance sealing at the interface of the split 336. Housing splits are described in more detail with reference to FIGS. 14-16, below.

Although hidden in FIG. 3, the energizer is also split. In operation, due to the mechanical compression of the energizer within an annular region between the inside diameter of the annular housing and the outside diameter of the matrix the split ends of the energizer are squeezed together and forced against each other. Thus, the split ends of the energizer form a leak proof joint.

The housing includes two radially extending surfaces disposed on opposite sides in the axial direction. A housing first radially extending surface 338 is shown in FIG. 3, while a housing second radially extending surface 339 is provided on the opposite side of the assembly 300 and is hidden from view.

Figure 4:
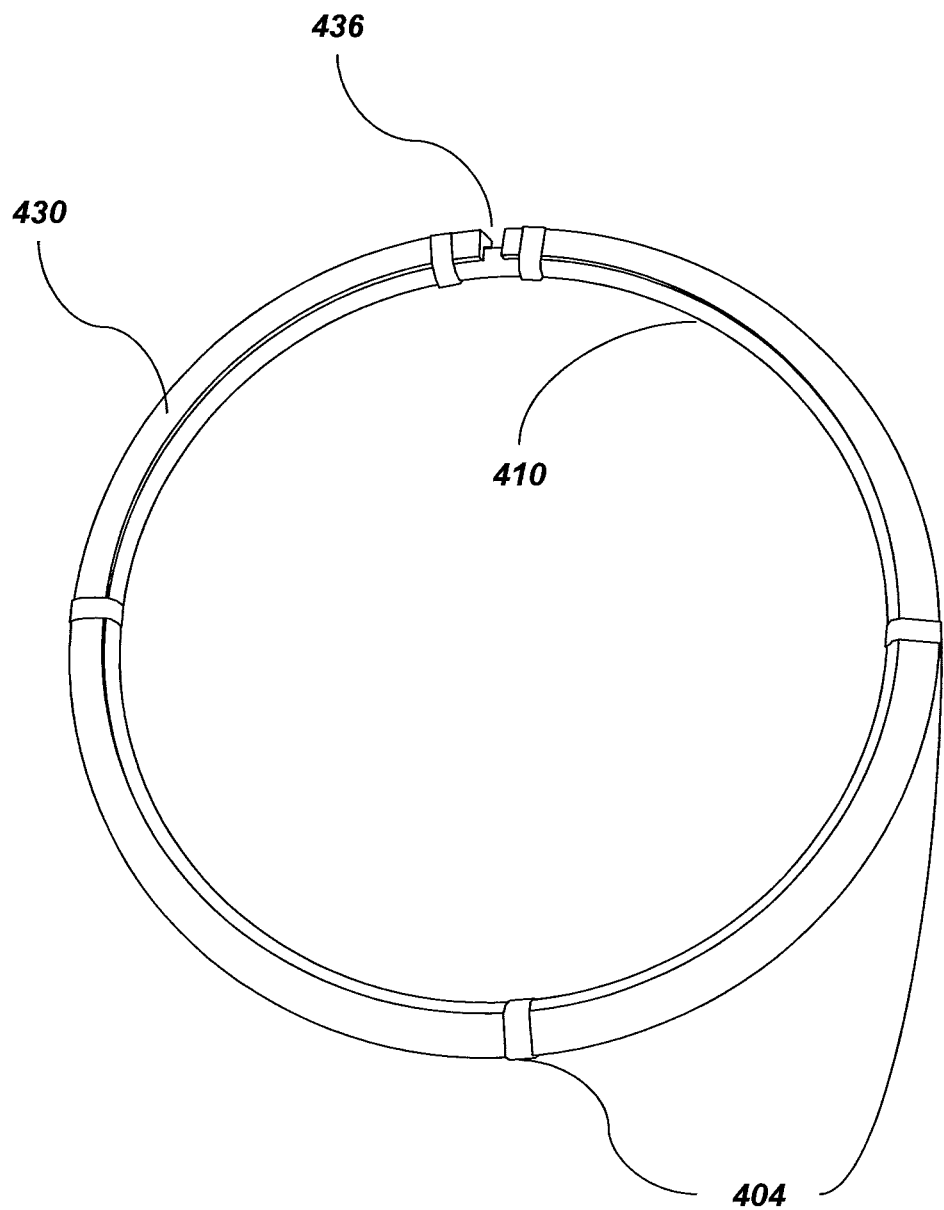
FIG. 4 depicts an assembled matrix split rotary seal according to an exemplary embodiment of the present invention.

A fully assembled matrix split rotary seal 400 is depicted in FIG. 4. The assembly 400 may include straps 404 for temporarily securing the matrix 410 to the housing 430. The housing 430 is split at a housing split 436. More or fewer housing splits 436 may also be provided.

In operation, the assembly 400 would be deployed between a rotating shaft and a static surface. For example, FIG. 5 is a cross-sectional view depicting a shaft 502, an exemplary matrix split rotary seal assembly according to a first embodiment of the invention, and a static component 550.

Figure 5:
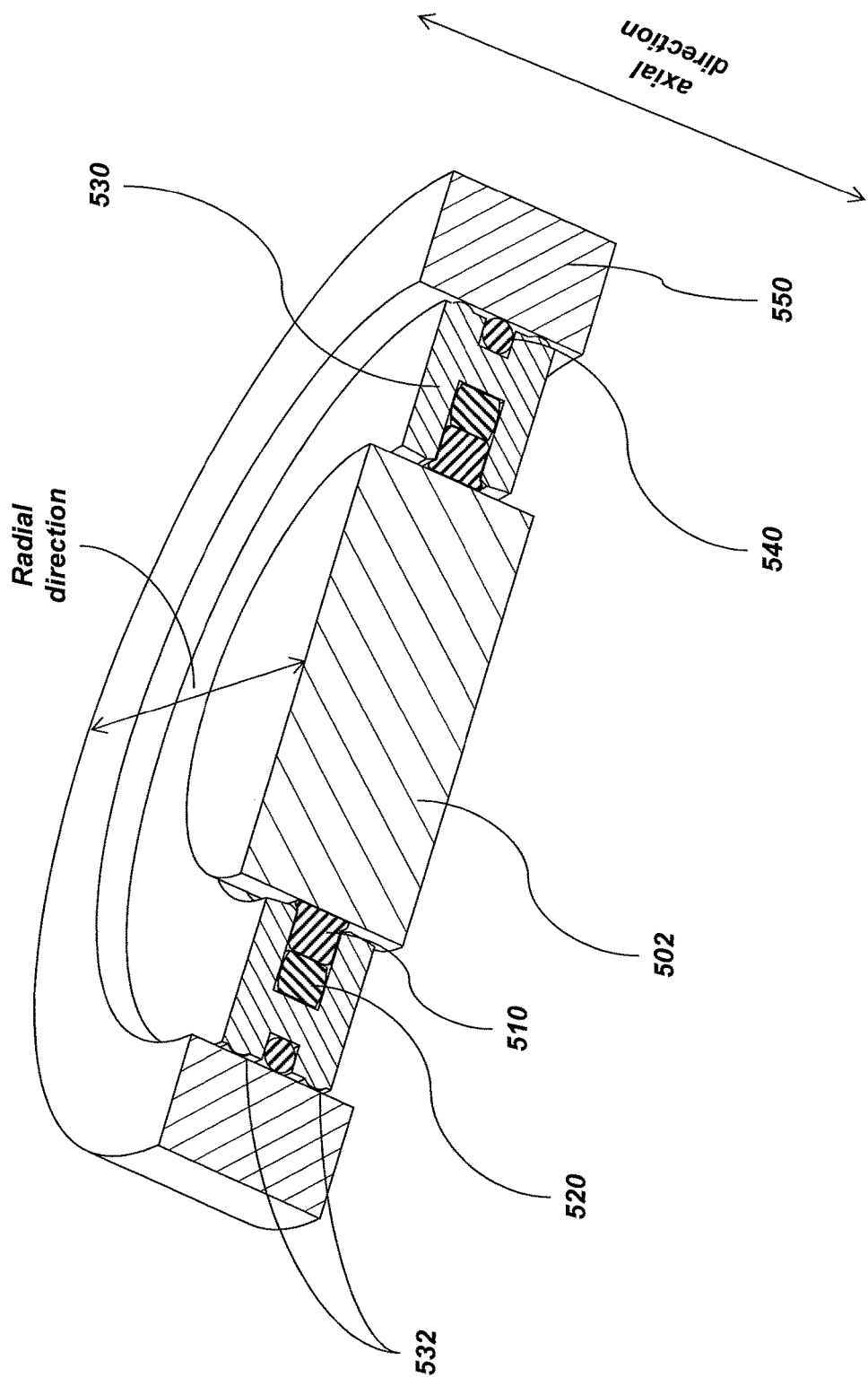
FIG. 5 is a cross-sectional view depicting a shaft, an exemplary matrix split rotary seal assembly according to a first embodiment of the invention, and a static component.

As indicated in FIG. 5, the axial direction generally follows the longitudinal length of the shaft. The radial direction extends outwardly from the center of the shaft in a direction perpendicular to the axial direction. It should be noted that the radial direction indicated in FIG. 5 is only one example of a radial direction.

A rotating shaft 502 is provided at the radial center of the seal assembly. The seal assembly forms a seal between the radially outer surface of the rotating shaft 502 and the radially inner surface of the matrix 510. The energizer 520 is disposed between the matrix 510 and an axially extending inner wall of a housing 530.

The static component 550 includes a radially inner surface, against which a radially outer surface of the housing 530 effects a seal. This may be accomplished by providing a static sealing surface 532 which is integral with the radially outer surface of the housing, or by providing one or more elastomeric static sealing elements 540 in a radially exterior outside channel of the housing 530. Examples of suitable elastomeric static sealing elements 540 include o-rings, gaskets, and other elastomeric structures suitable for effecting a seal.

Instead of providing separate, non-integral, static sealing elements 540, the static sealing can be effected solely using an integral sealing surface 632 on the radially outer end of the housing 530, as in the exemplary embodiment depicted in FIG. 6.

FIG. 6 is a cross-sectional perspective view of a matrix split rotary seal according to a second embodiment of the invention. A rotating shaft 602 effects a seal with a radially inner surface of a matrix 610. The matrix 610 is energized by an energizer 620, and the matrix 610 and energizer 620 are provided in a housing 630. Integrated housing static sealing surfaces 632 effect a seal with a static component 650.

As further shown in FIG. 6, the matrix 610 has a matrix inner diameter $D_{iM}$ 642, which is measured from the radially inner surface of the matrix 610. The matrix inner diameter $D_{iM}$ 642 is determined by the diameter of the shaft 602 against which the matrix 610 will effect a seal.

Further, the housing 630 defines a housing first inner diameter $D_{iH1}$ 644, which is measured from the radially innermost point on radially innermost surface the housing. A housing second inner diameter $D_{iH2}$ 646 is measured from the radially outermost point on the radially innermost surface of the housing. In a preferred embodiment, the matrix inner diameter $D_{iM}$ 642 is less than the housing first inner diameter $D_{iH1}$ 644. In this way, a portion of the matrix 610 protrudes outside the housing 630 in the radial direction.

The housing further defines a housing outer diameter $D_{oH}$ 648, which is measured across the radially outermost points on the housing. This is typically the point at which the housing static sealing surface 632 contacts the static surface 650.

The seal assembly 600 of FIG. 6 is shown in more detail in the cross sectional views of FIGS. 7A-7E.

Figure 7A:
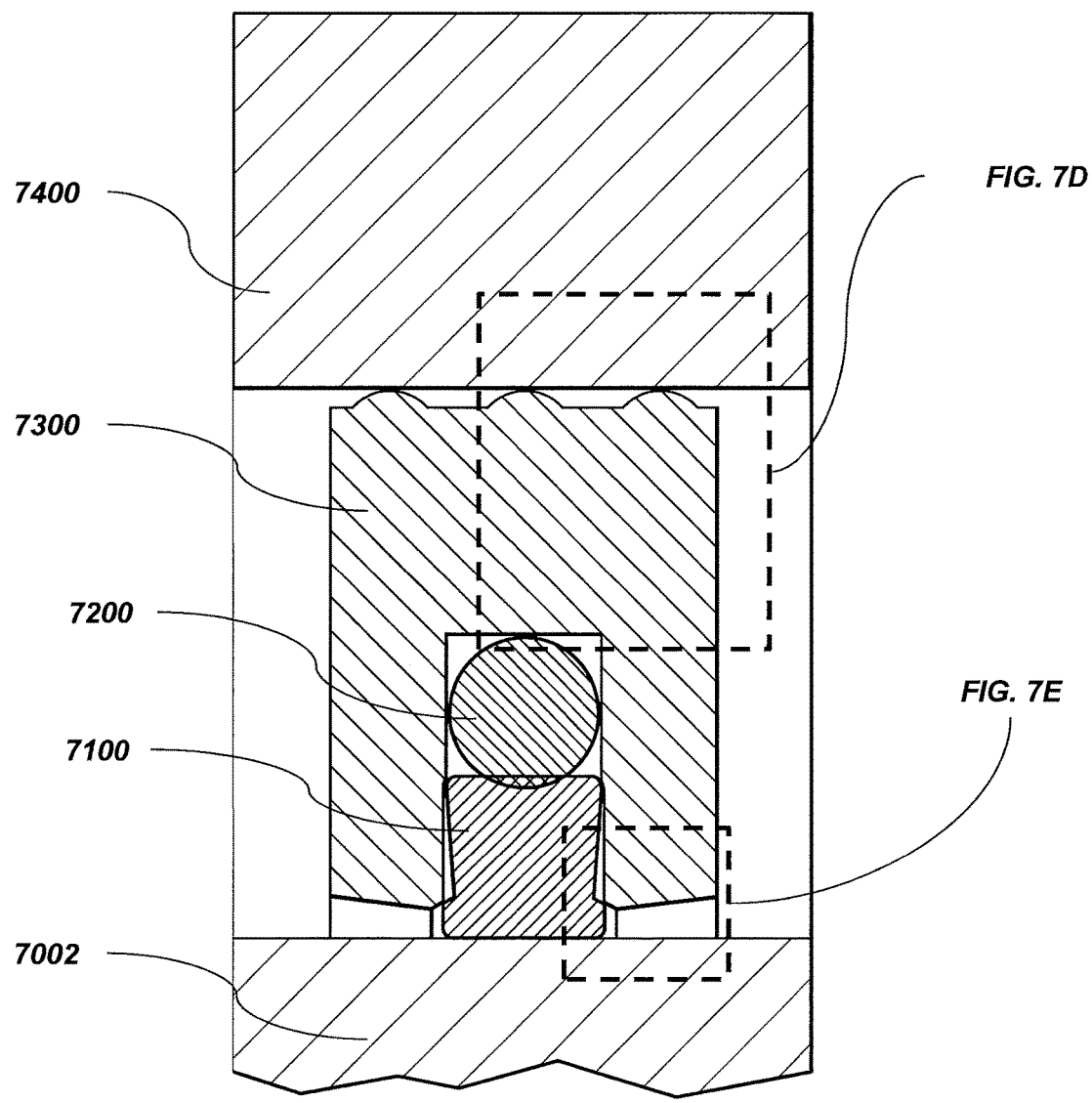
FIG. 7A is a cross-sectional view of the matrix split rotary seal assembly of FIG. 6.

FIG. 7A is a cross-sectional view of the matrix split rotary seal assembly of FIG. 6. As shown in FIG. 7A, a rotating shaft 7002 effects a seal with a radially inner surface of a matrix 7100. The matrix 7100 is energized by an energizer 7200, and the matrix 7100 and energizer 7200 are provided in a housing 7300. The radially outer surface of the housing 7300 effects a seal with a static component 7400.

Figure 7B:
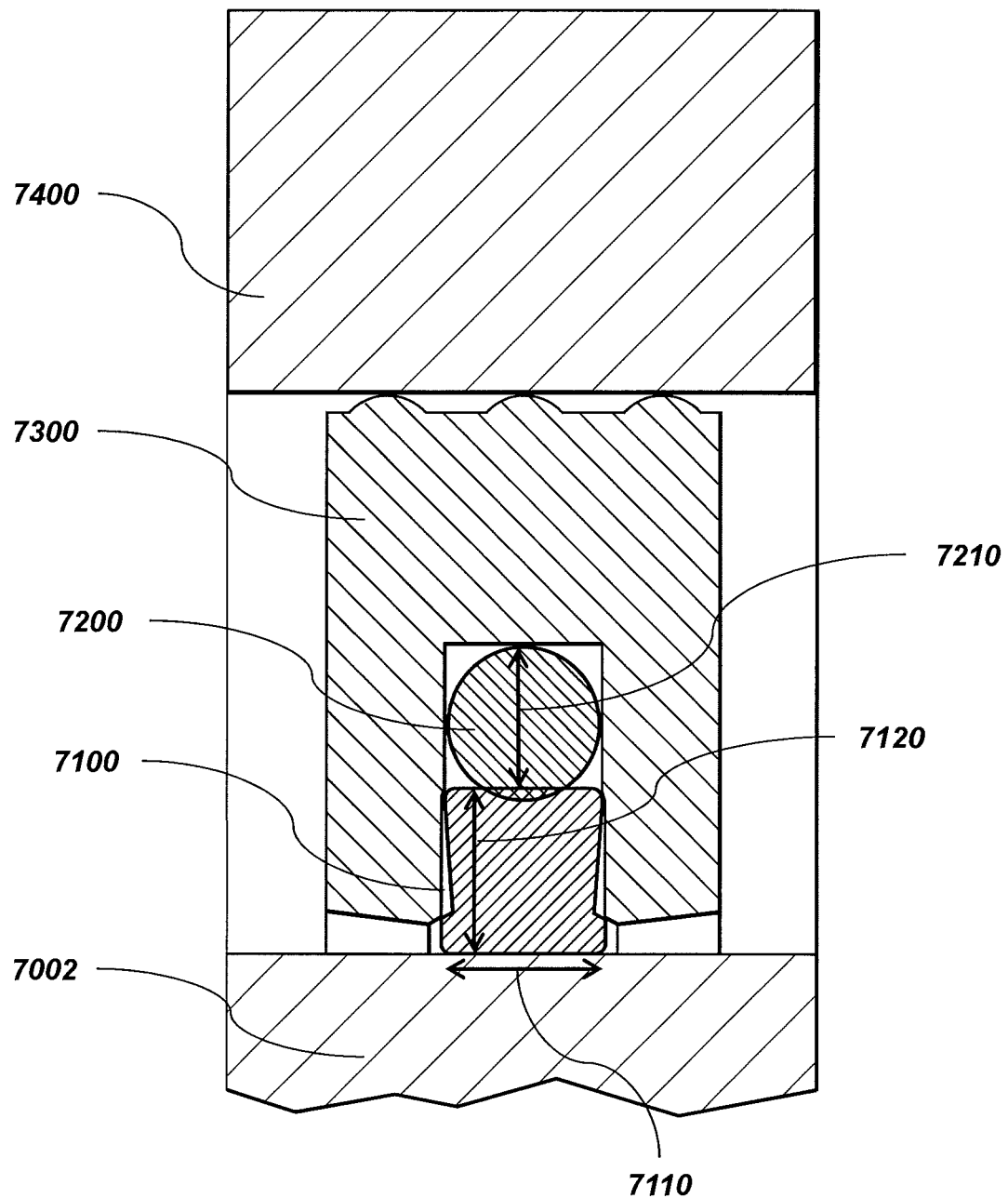
FIG. 7B is a cross-sectional view of the matrix split rotary seal assembly of FIG. 6 highlighting additional features.

FIG. 7B is a cross-sectional view of the matrix split rotary seal assembly of FIG. 6 showing the matrix 7100 and the energizer 7200 in more detail.

The matrix 7100 is defined by a matrix width 7110 and a matrix height 7120. The matrix width 7110 and height 7120 will vary depending on the size and application of the seal assembly. In one exemplary embodiment the matrix width 7330 is 0.626 inch and the matrix height 7310 is 0.500 inch.

Furthermore, the dimensions of the matrix 7100 will vary depending on the cross-sectional geometry of the matrix 7100. The matrix 7100 need not be rectangular in cross-section, but may accommodate any of a variety of suitable shapes, such as a trapezoid.

The energizer diameter 7210 defines the cross-sectional size of the energizer. The energizer 7200 need not be circular in cross-section, but may accommodate any of a variety of suitable shapes, such as a rectangle or trapezoid.

Typically, the energizer diameter 7210 and the matrix width 7110 may be dictated by the size and shape of the radially interior inside channel of the housing 7300 in which the matrix 7100 and the energizer 7200 are disposed. The energizer diameter 7210 and the matrix width 7110 are slightly larger than the width of the radially interior inside channel to ensure a snug fit and ease operation.

Furthermore, the energizer diameter 7210 and the matrix height 7120 in combination may be dictated by the radial length of the radially interior inside channel of the housing 7300. The energizer diameter 7210 and the matrix height 7120 should be selected so that the matrix 7100 may protrude from the radially interior side of the housing 7300, even when the matrix 7100 and the energizer 7200 are compressed during operation.

Figure 7C:
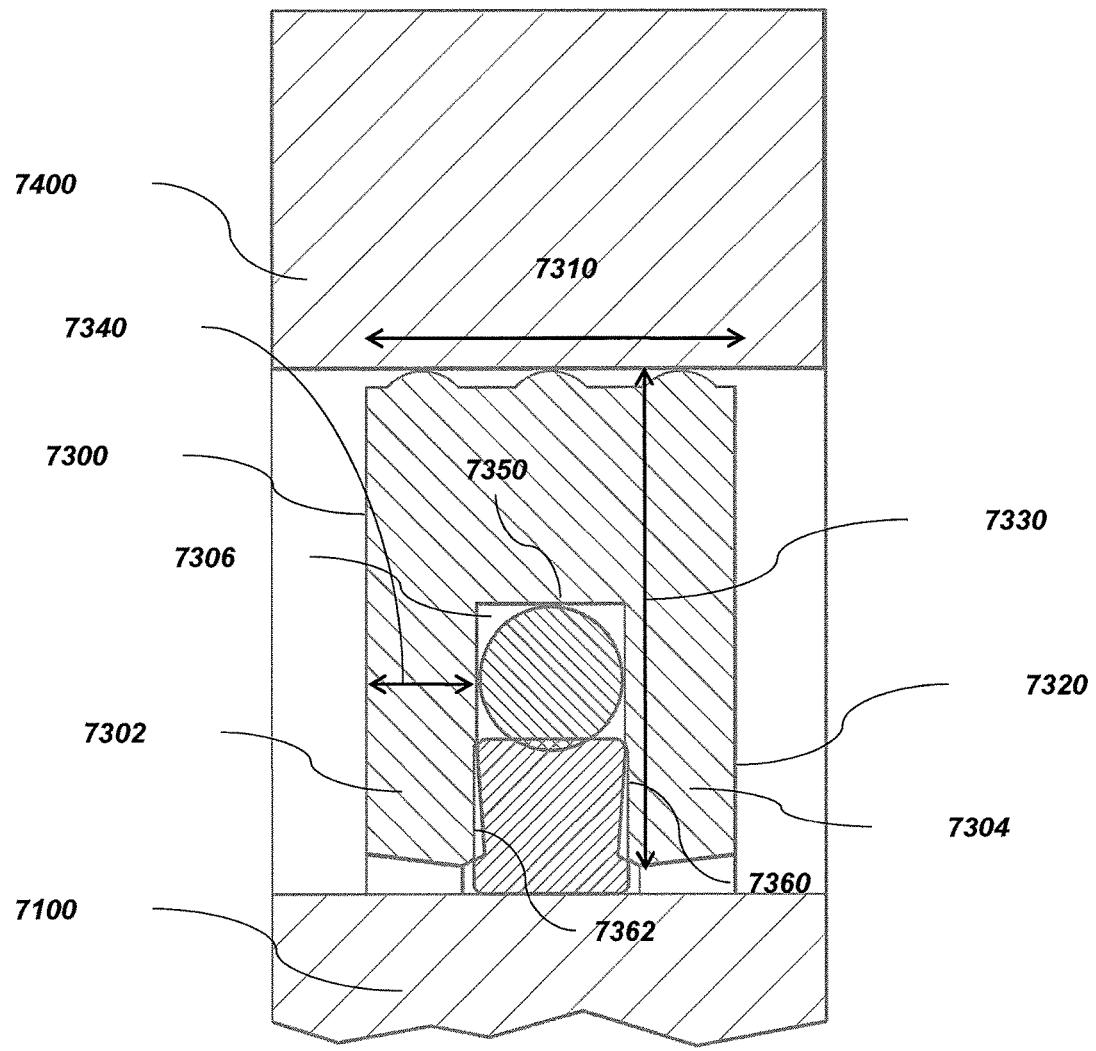
FIG. 7C is a cross-sectional view of the matrix split rotary seal assembly of FIG. 6 highlighting additional features.

As shown in FIG. 7C, a cross section of the housing 7300 may be symmetrical about a centerline draw in the radial direction. The housing 7300 has an overall housing depth 7310, extending from one radially extending face of the housing 7300 (e.g., radially extending face 7320) to radially extending face on the opposite side of the housing 7300 in the axial direction. Although the housing depth 7310 will vary by application, an exemplary housing depth 7310 is 0.500.

The housing 7300 is also defined by the housing outermost width 7330, which extends in the radial direction from the radially innermost point on the housing to the radially outermost point of the housing. Although the housing outermost width 7330 will vary by application, an exemplary housing outermost width 7330 is 0.625 inch.

As shown in FIG. 7C, the housing 7300 includes two arms 7302, 7304 surrounding the radially interior inside channel 7306. Each of the arms 7302, 7304 has an inner depth 7340. Although the inner depth 7340 will vary by application, an exemplary inner depth 7340 is 0.100.

The arms 7302, 7304 surround the radially interior inside channel 7306, which includes three walls. An interior axially extending wall 7350 is provided at the radially outermost location of the radially interior inside channel 7306 and extends between the two arms 7302, 7304. Although the length of the interior axially extending wall 7350 will vary by application, an exemplary length is 0.300 inch.

The radially interior inside channel 7306 further includes two interior substantially radially extending walls 7360, 7362. The substantially radially extending walls 7360, 7362 extend substantially in the radial direction. However, the substantially radially extending walls 7360, 7362 may extend at an angle from the radial direction, such as an angle in the range of 5 to 10 degrees. Thus, the substantially radially extending walls 7360, 7362 may cause the radially interior inside channel 7306 to taper towards a radially interior end, thus securing and slightly compressing the matrix 7100. Although the length of the substantially radially extending walls 7360, 7362 will vary by application, an exemplary length is 0.300.

Figure 7D:
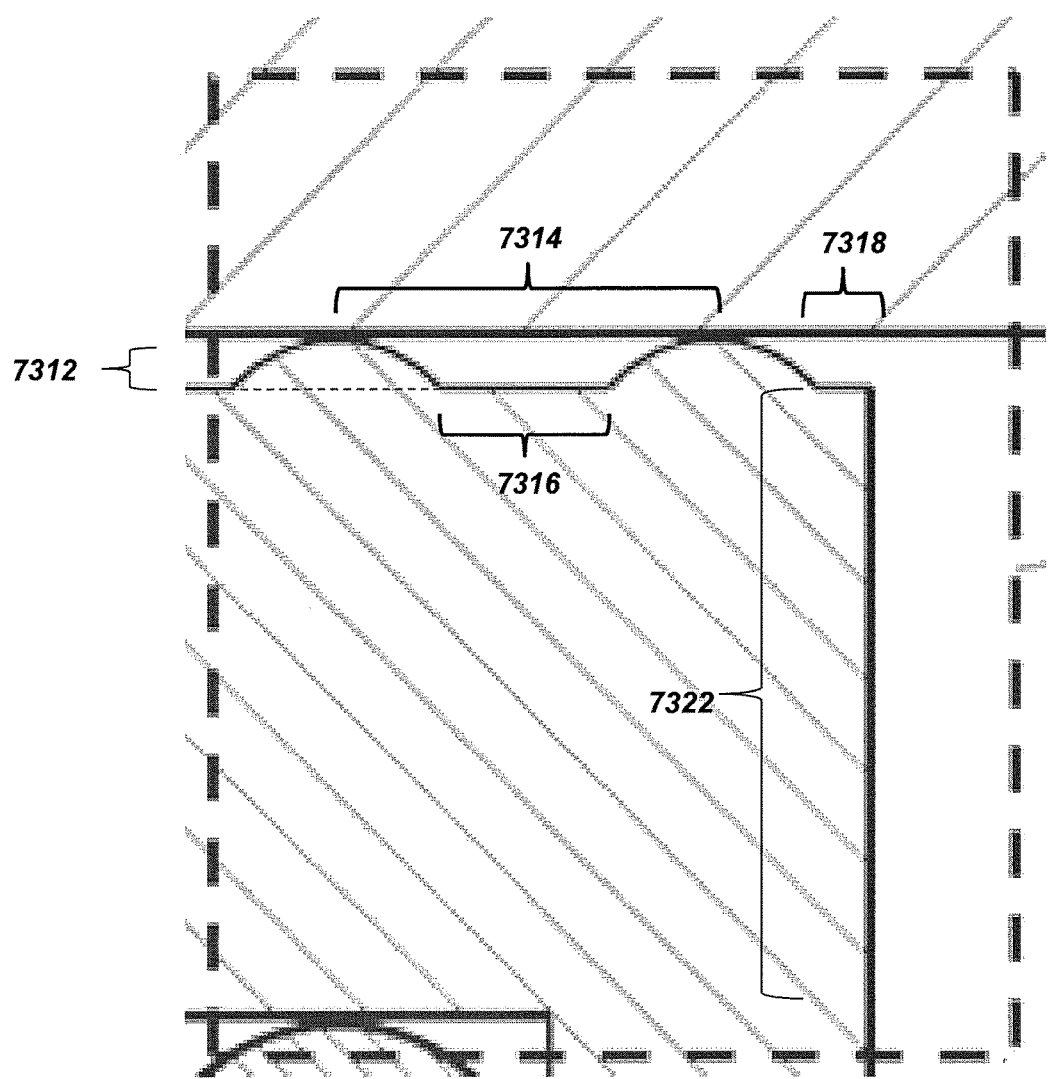
FIG. 7D is a close up of a radially outer portion of the cross-sectional view of the matrix split rotary seal assembly of FIG. 6.

FIG. 7D is a close up of a radially outer portion of the cross-sectional view of the matrix split rotary seal assembly of FIG. 7A. As shown in FIG. 7D, the housing 7300 includes a series of raises surfaces for effecting a seal against a static surface 7400. Each raised surface extends radially outwardly from a flat axially extending surface of the housing 7300 by a predetermined distance 7312. Although the amount of the predetermined distance 7312 will vary by application, an exemplary amount is 0.015 inch.

Further, more than one raised surface may be provided, depending on the application. In the exemplary sealing assembly depicted in FIGS. 7A-7E, three such surfaces are present. Each raised surface includes a peak at a point where the raised surface makes contact with the static surface 7400 and a trough at a point where the raised surface returns to the height of the flat axially extending surface of the housing 7300. Accordingly, a housing integrated static sealing element peak-to-peak distance 7314 is defined between the peaks of two adjacent raised surfaces. The amount of the peak-to-peak distance 7314 will vary by application. Similarly, a housing integrated static sealing element trough-to-trough distance 7316 is also defined. Although the amount of the trough-to-trough distance 7316 will vary by application, an exemplary amount is 0.300 inch.

Furthermore, the axially outermost raised surfaces may reach a trough a certain distance from the axially outer edges of the housing 7300. Accordingly, a housing integrated static sealing element trough-to-edge distance 7318 is defined. Although the amount of the trough-to-edge distance 7318 will vary by application, an exemplary amount is 0.020 inch. The trough-to edge distance 7318 may be zero; that is, the axially outermost raised surfaces may end directly on the axially outer edges of the housing 7300.

Further, the raised surfaces which extend from the flat axially extending surface of the housing 7300 are provided at a predefined distance 7322 away from the previously described housing interior axially extending wall 7350. The amount of the predefined distance 7322 will vary by application.

Figure 7E:
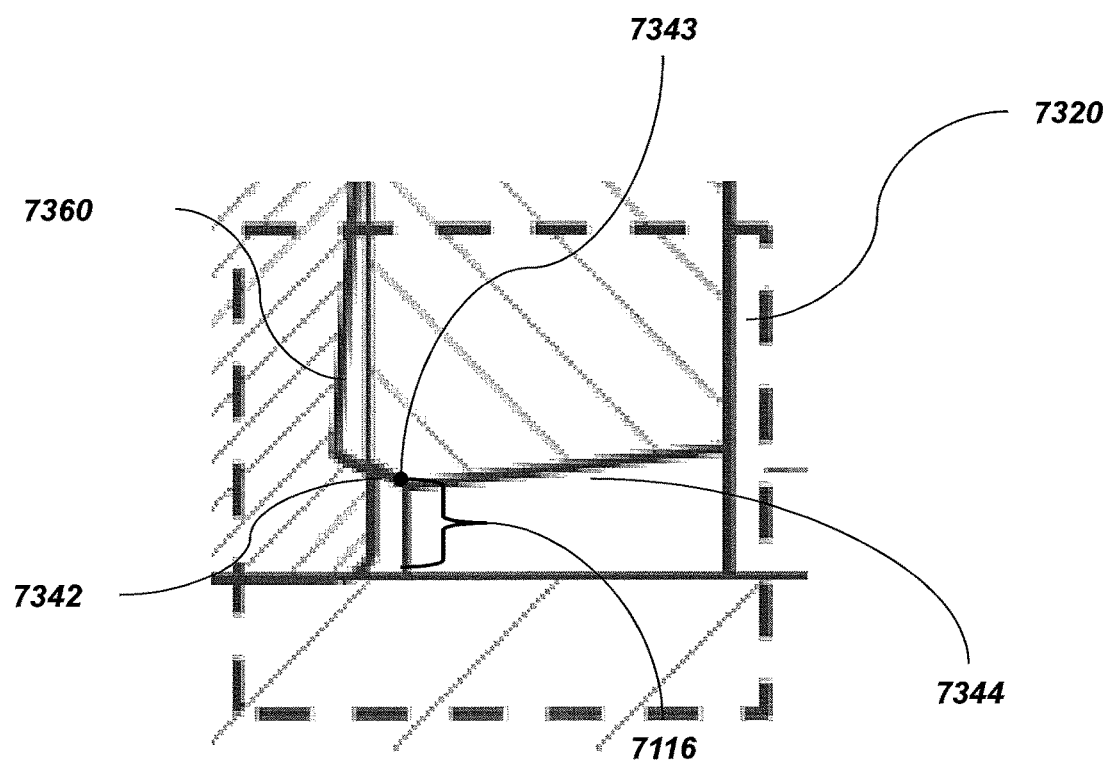
FIG. 7E is a close up of a radially inner portion of the cross-sectional view of the matrix split rotary seal assembly of FIG. 6.

FIG. 7E is a close up of a radially inner portion of the cross-sectional view of the matrix split rotary seal assembly of FIG. 7A. As previously described, a portion 7116 of the matrix is exposed beyond the end of the housing 7300. Although the amount of the exposed portion 7116 may vary depending on the application, an exemplary amount is 0.200.

Furthermore, a housing radially inner first slanted wall 7342 and a housing radially inner second slanted wall 7344 extend along the radially innermost surface of the housing 7300 and meet at a meeting point 7343. The housing radially inner first slanted wall 7342 and the housing radially inner second slanted wall help to prevent the matrix 7100 from rotating. The angles of the housing radially inner first slanted wall 7342 and the housing radially inner second slanted wall 7344 (relative to the axial direction) may be selected accordingly. Generally, the angle of the housing radially inner first slanted wall 7342 is different than the angle of the housing radially inner second slanted wall 7344. The angle of the housing radially inner first slanted wall 7342 may be selected from a range encompassing 0°-45° relative to the axial direction. The angle of the housing radially inner second slanted wall 7344 may be selected from a range encompassing 0°-20° relative to the axial direction.

Figure 8:
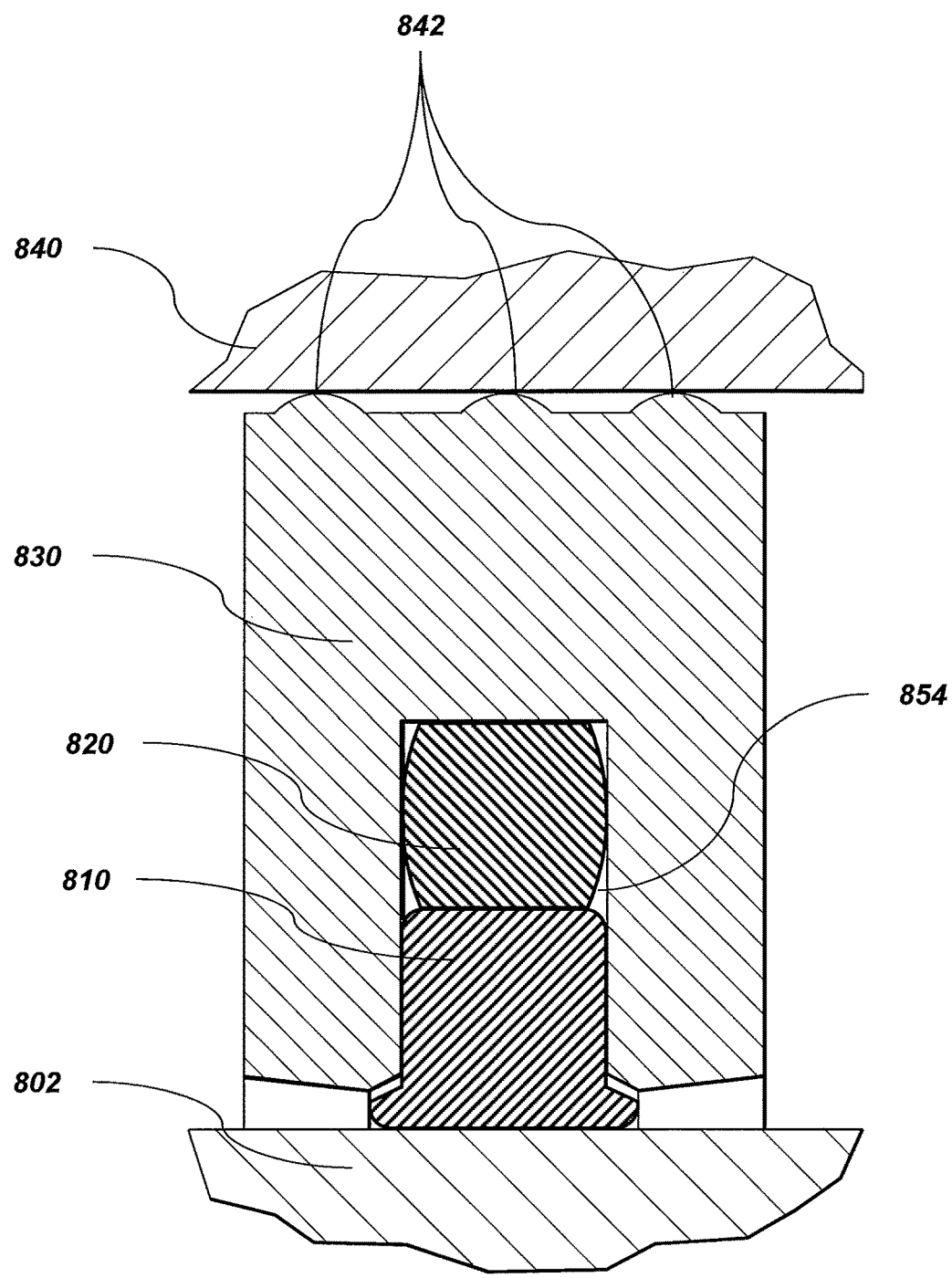
FIG. 8 depicts the matrix split rotary seal of FIG. 6 in operation, showing a change in shape of the energizer and matrix.

The various components of the sealing assembly may be compressed during operation. FIG. 8 depicts a matrix split rotary seal assembly according to the first embodiment of the invention in operation, showing a change in shape of the energizer and matrix.

A rotating shaft 802 effects a seal with a radially inner surface of a matrix 810. The matrix 810 is energized by an energizer 820, and the matrix 810 and energizer 820 are provided in a housing 830. Integrated housing static sealing surfaces 832 effect a seal with a static component 850.

In operation, the energizer 820 compresses and conforms to the boundaries of the radially interior inside channel 854 of the housing 830. As the energizer 820 compresses, the energizer may form four sides. By conforming to the boundaries of the radially interior inside channel 854 of the housing 830, the energizer 820 provides sealing areas on each of the three facing sides of the radially interior inside channel 854 of the housing 830 and the outside diameter of the matrix 810. The energizer 820 may also act as a static seal between the matrix 810 and an axially extending inner wall of the radially interior inside channel 854 of the housing 830.

The matrix 820 moves radially in/out within the housing 830 to follow the shaft 802 which may not be rotating concentrically within the equipment. Due to the combined movement of energizer 820 and matrix 810, the matrix 810 follows the rotating shaft 802 in radial displacements.

As the matrix 810 follows the shaft 802 runout, the surfaces of the matrix 810 that are perpendicular to the shaft 820 maintain a leakfree interface with the radially interior inside channel 854 walls of the housing 830. Furthermore, the seal assembly does not need to be constantly readjusted.

Figure 9A:
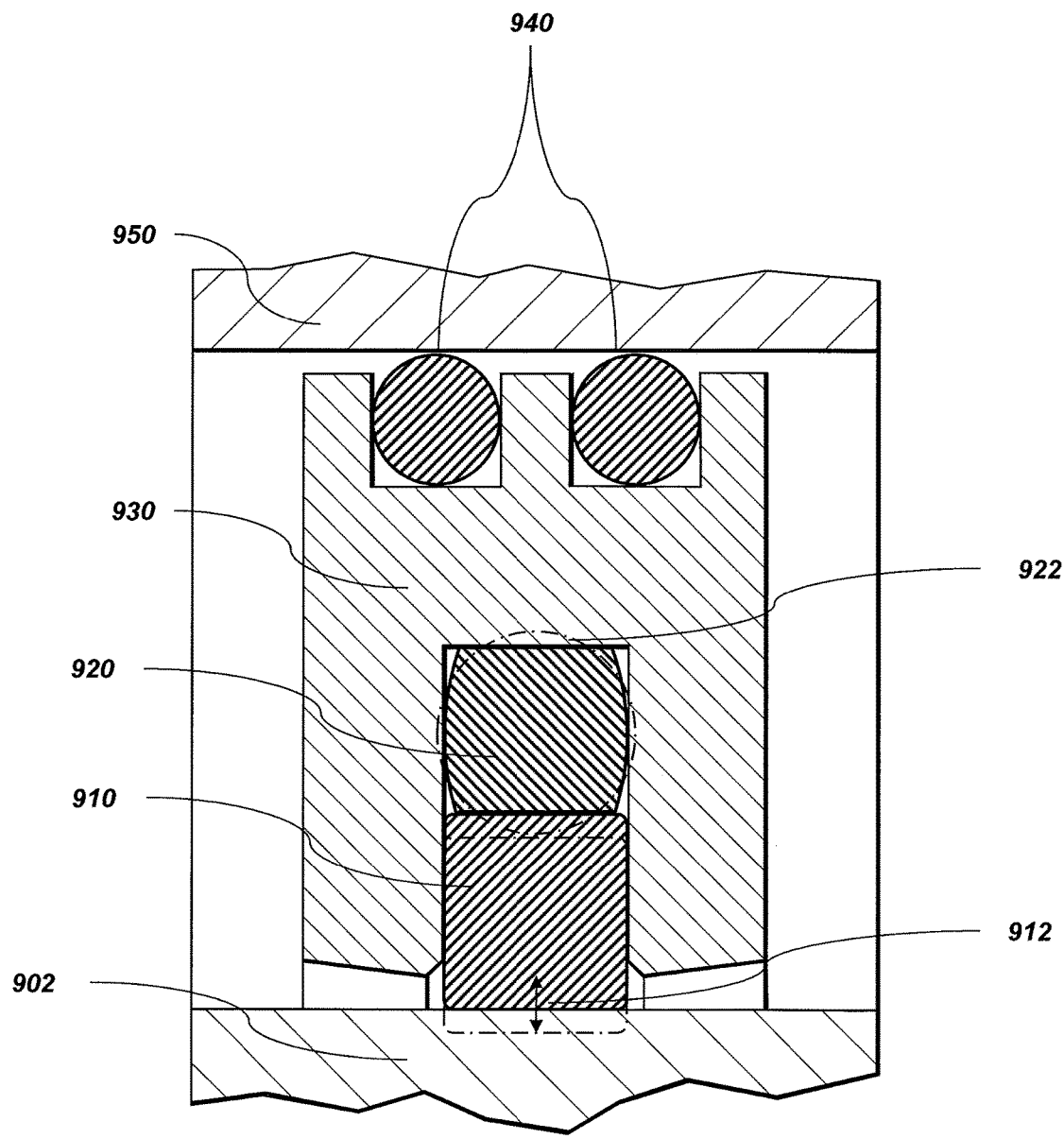
FIG. 9A is a cross sectional view of a matrix split rotary seal according to a third embodiment of the invention.
Figure 9B:
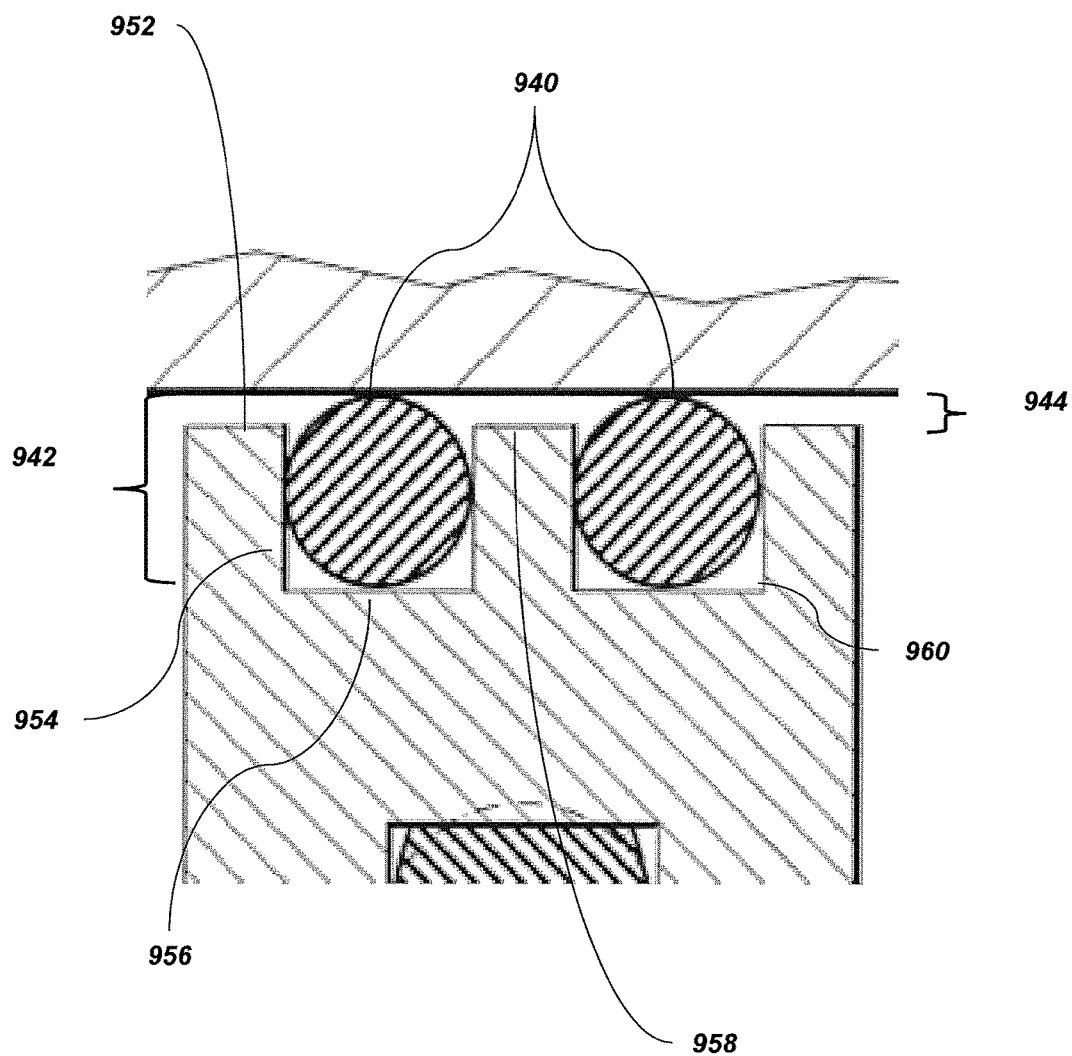
FIG. 9B is a close up of a radially outer portion of the matrix split rotary seal of FIG. 9A.

A third embodiment of the invention is depicted in FIG. 9A-9B. As shown in FIG. 9A, a rotating shaft 902 effects a seal with a radially inner surface of a matrix 910. The matrix 910 is energized by an energizer 920, and the matrix 910 and energizer 920 are provided in a housing 930. Two static sealing elements 940 effect a seal with a static component 950.

As shown in FIG. 9A, in operation the matrix 910 may deform by a certain deformation amount 912. The deformation amount 912 may vary depending on the application. Furthermore, in operation the energizer 920 may deform by a second deformation amount 922. Although the second deformation amount 922 may vary depending on the application, an exemplary amount is 0.040 inch.

FIG. 9B is a close up of a radially outer portion of the matrix split rotary seal of FIG. 9A. As shown in FIG. 9B, the static sealing elements 940 (o-rings in the present case) have a static sealing element diameter 942. Although the static sealing element diameter 942 may vary depending on the application, an exemplary amount is 0.125 inch.

A portion 944 of the static sealing element 940 is exposed above an axially extending surface of the housing 930. The size of the exposed portion 944 may generally correspond to the static sealing element height 7312 of FIG. 7D, and may be selected by varying the depth of the radially exterior outside channels 960 provided on a radially exterior axially extending surface of the housing 930. The radially exterior outside channels 960 are each defined by radially extending walls 954 and an axially extending wall 956. The first radially extending wall 954 extends from a first radially exterior axially extending wall 952 in a radial direction and terminates at a second radially exterior axially extending wall 956. A second radially extending wall extends from the first radially exterior axially extending wall 952 in a radial direction and terminates at a third radially exterior axially extending wall 958.

In this way, one or more radially exterior outside channels 960 may be provided for accommodating static non-integral sealing elements 940.

Figure 10A:
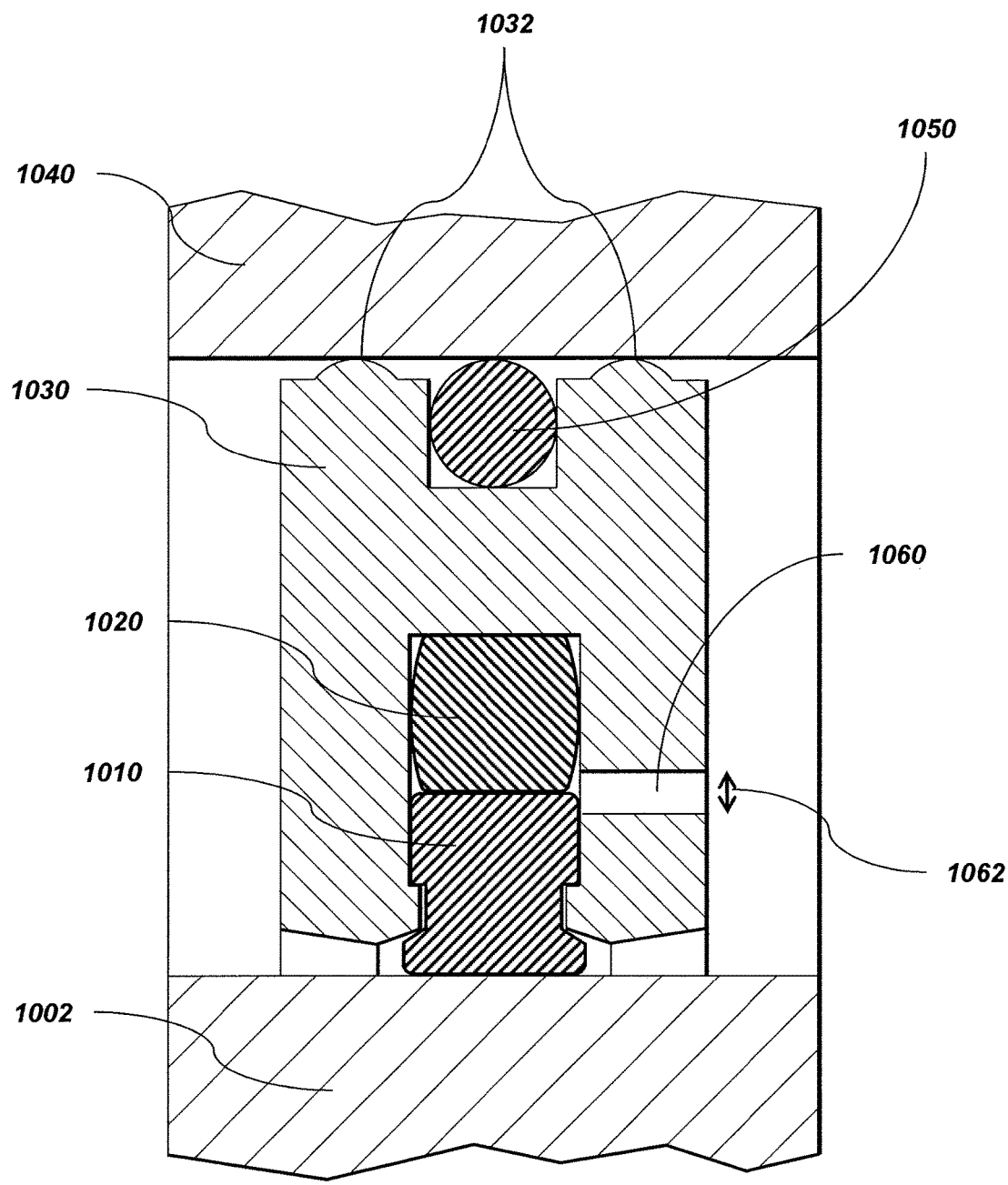
FIG. 10A is a cross-sectional view of a matrix split rotary seal including a pressure actuation port according to a fourth embodiment of the invention.
Figure 10B:
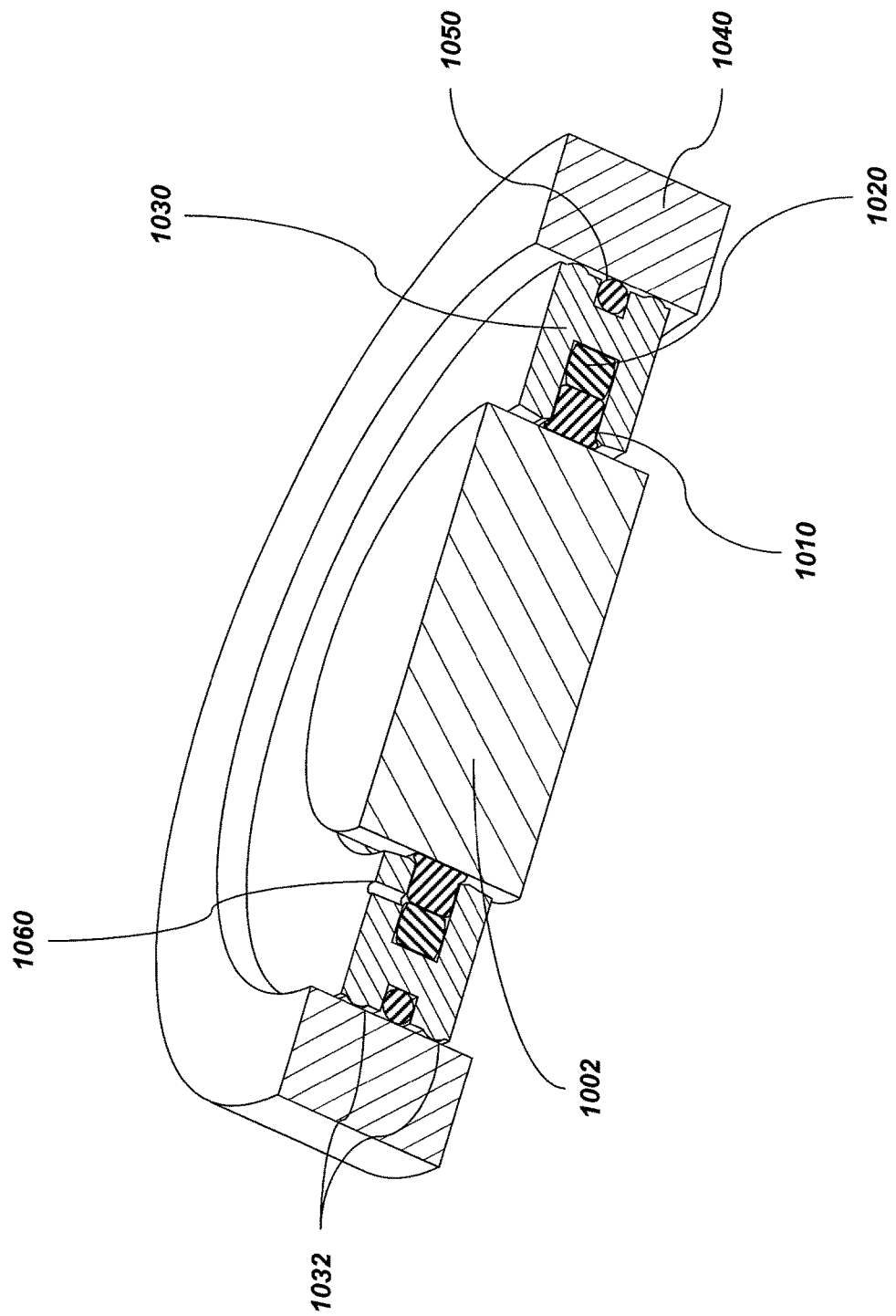
FIG. 10B is a perspective view of the matrix split rotary seal of FIG. 10A.

A fourth embodiment of the invention employing a pressure actuation port is described with reference to FIGS. 10A-10B. As shown in FIG. 10A, a rotating shaft 1002 effects a seal with a radially inner surface of a matrix 1010. The matrix 1010 is energized by an energizer 1020, and the matrix 1010 and energizer 1020 are provided in a housing

1030. Two static sealing surfaces 1032 formed on a radially outward side of the housing 1030 effect a seal with a static component 1040, in conjunction with a non-integral static sealing element 1050.

Further, the housing 1130 includes one or more pressure actuating ports 1060. The pressure actuating port 1060 is drilled axially into the housing at a location radially lateral to the energizer 1020. Process fluid at a pressure higher than the ambient pressure may be supplied through the pressure actuating port 1060. This allows process pressure to actuate the energizer, thereby applying additional force on the outside diameter of the matrix 1010 to create sufficient sealing force between the rotating shaft 1002 and the inside diameter of the matrix 1010. That is, the process fluid may energize the matrix from the back side. Accordingly, leakage of process fluid may be prevented.

In some embodiments, the pressure actuating port 1060 has a diameter 1062 in the range of 0.050 to 0.100 inch.

A fifth embodiment of the invention is described below with reference to FIGS. 11A-11C.

Figure 11A:
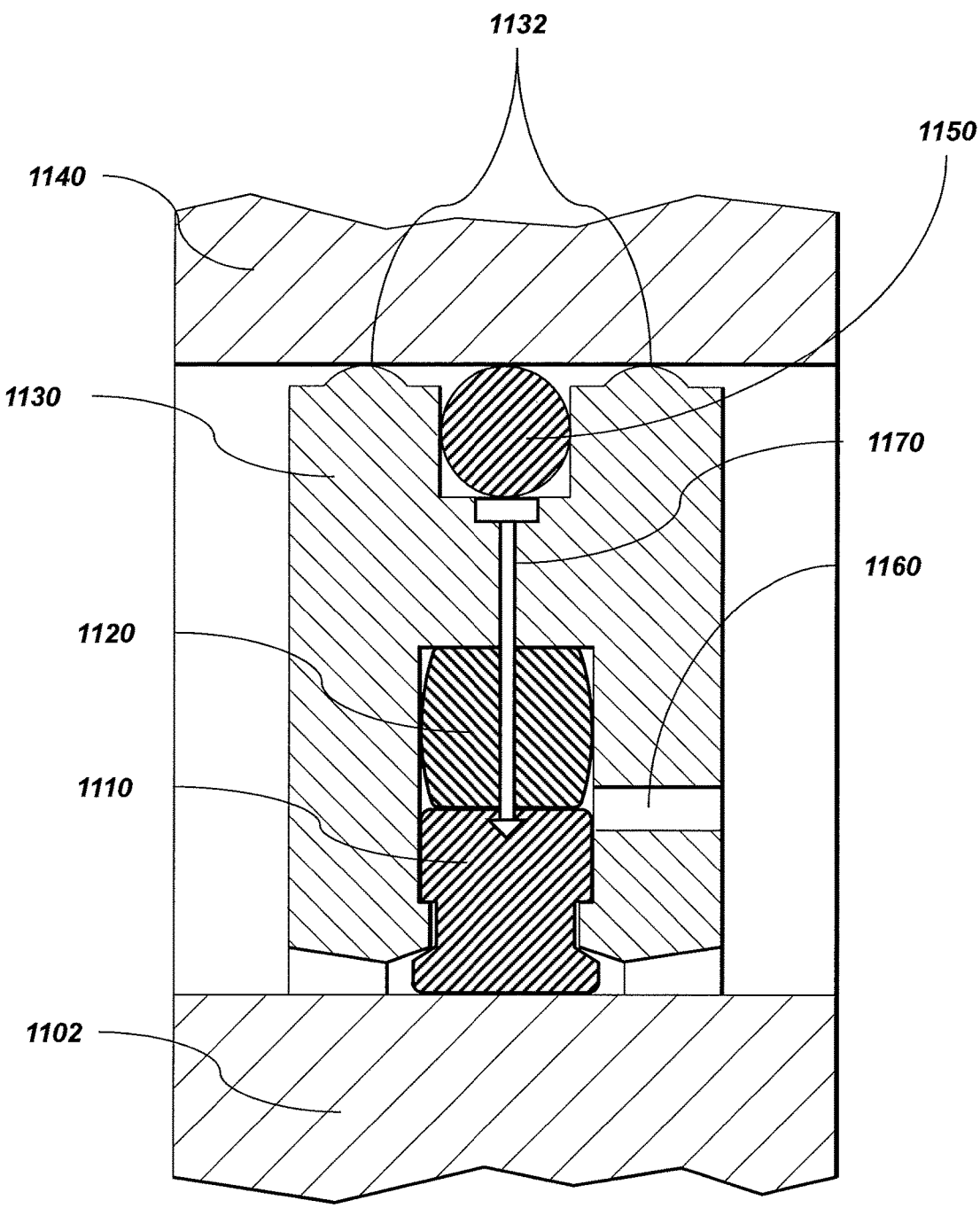
FIG. 11A is a cross-sectional view of a matrix split rotary seal including a pressure actuation port and an anti-rotation element according to a fifth embodiment of the invention.

FIG. 11A is a cross-sectional view of a matrix split rotary seal including a pressure actuation port and an anti-rotation element according to a fifth embodiment of the invention. As shown in FIG. 11A, a rotating shaft 1102 effects a seal with a radially inner surface of a matrix 1110. The matrix 1110 is energized by an energizer 1120, and the matrix 1110 and energizer 1120 are provided in a housing 1130. Two static sealing surfaces 1132 formed on a radially outward side of the housing 1130 effect a seal with a static component 1140, in conjunction with a non-integral static sealing element 1150. Furthermore, the housing 1130 may include one or more pressure actuating ports 1160.

In general, some sort of anti-rotation feature may be needed to hold the matrix 1110 to counter rotating frictional forces applied between the shaft and the inside diameter of the matrix 1110. The force applied to the matrix 1110 is the product of the coefficient of friction of the matrix 1110 and the normal force applied by the energizer 1120 on the outside diameter of the matrix 1110.

In some circumstances, the compression force applied axially to the matrix 1110 due to interference with the housing 1130 may be sufficient to prevent the matrix 1110 from rotating. However, in other circumstances where the compression force is not sufficient to hold the matrix 1110, a positive anti-rotational force may be advantageous. Accordingly, an additional anti-rotational element 1170 may be superimposed to positively capture the matrix 1110 and prevent the matrix 1110 from rotating.

The anti-rotational element 1170 may be one or more pins, staples, or screws applied in a radial fashion to the housing 1130. One or more thru-holes may be drilled into the housing 1130 and an anti-rotational element 1170 may be applied to the matrix 1110. The through holes and the anti-rotational element 1170 may or may not be threaded. In some embodiments (e.g., as shown in FIG. 11A), the anti-rotational element 1170 may extend through the housing 1130, the matrix 1100, and/or the energizer 1120 (and other components, if present) in a radial direction. In other embodiments (e.g., see FIGS. 18A-18E), the anti-rotational element 1170 may extend through one or more of these components in an axial direction.

The anti-rotational element 1170 may be formed of plastic or polymer. The anti-rotational element 1170 would typically not be formed of a metal, in order to prevent damage if the anti-rotational element 1170 comes into contact with the rotating shaft 1102.

In addition to providing anti-rotational properties, the anti-rotational element 1170 also provides matrix attachment while the seal assembly is opened and maneuvered into position during installation.

Figure 11B:
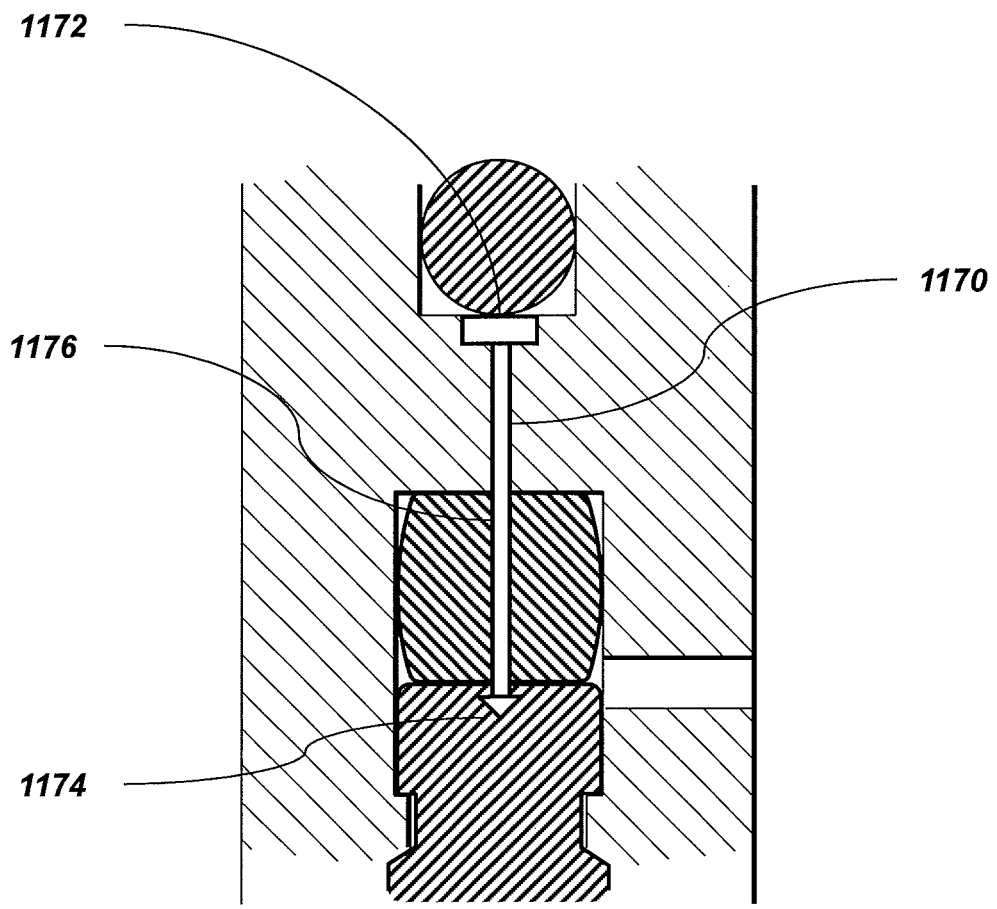
FIG. 11B is a close up of the anti-rotation element of FIG. 11A.

FIG. 11B is a close up of the anti-rotation element 1170 of FIG. 11A. As shown in FIG. 11B, the anti-rotation element 1170 includes a proximal end 1172 and a distal end 1174. During installation, the distal end 1174 is inserted through the housing 1130 and the matrix 1120. The distal end 1174 pierces the matrix 1110 to a predetermined depth, for example 0.050 Care should be taken so that the distal end 1174 will not protrude through the end of the matrix, which could cause the anti-rotation element 1170 to contact the rotating shaft 1102, damaging the anti-rotation element 1170 or the shaft 1102. However, the distal end 1174 of the anti-rotation element 1170 should extend far enough into the matrix 1110 so that the anti-rotation element 1170 can hold the matrix 1110 in place. Accordingly, a size of the anti-rotation element shaft 1176 should be selected so that the distal end 1174 of the anti-rotation element 1170 can extend from the proximal end 1172 an appropriate amount. For example, in one embodiment, the shaft 1176 of the anti-rotation element 1170 is 0.20 inch in diameter.

Figure 11C:
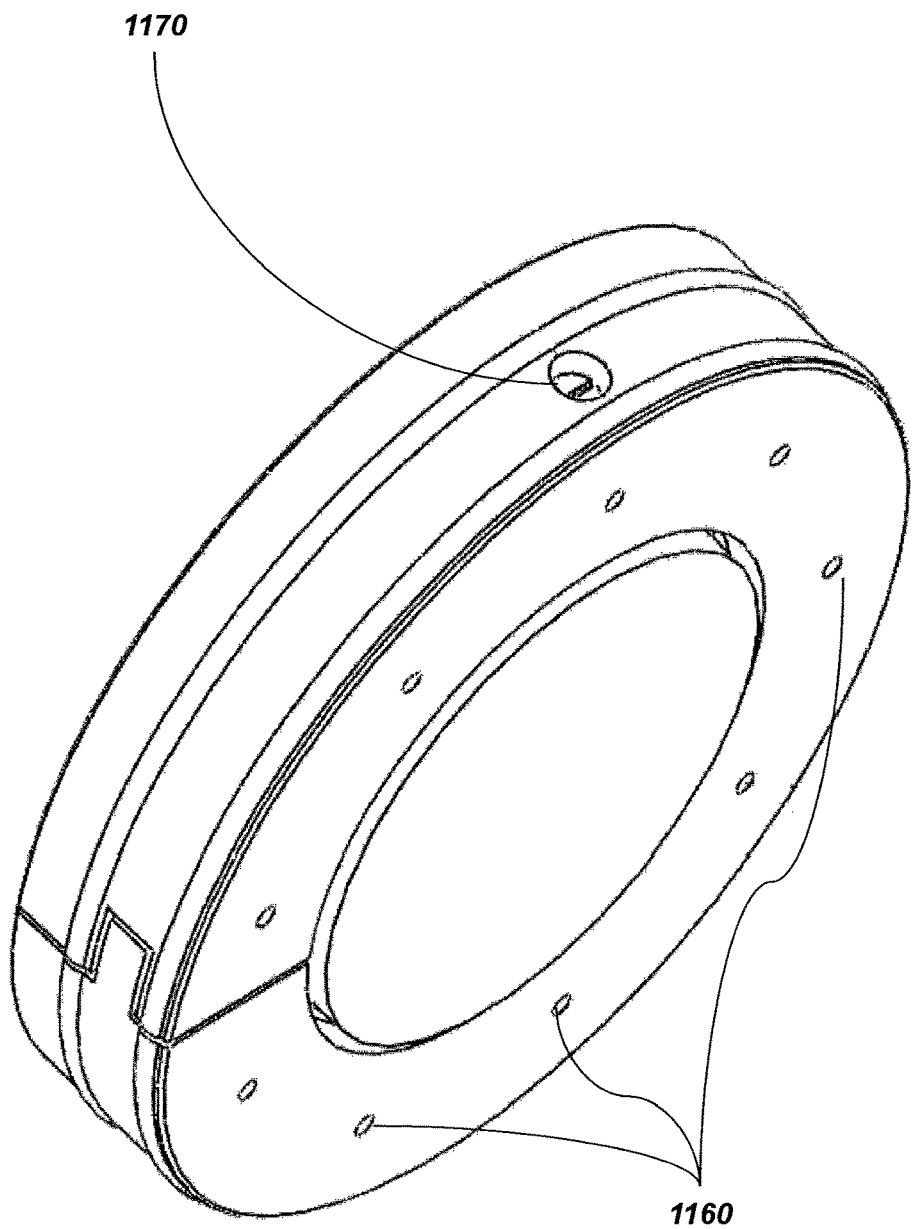
FIG. 11C is a perspective view of the matrix split rotary seal assembly of FIG. 11A-11B.

FIG. 11C is a perspective view of the matrix split rotary seal assembly of FIG. 11A-11B. As show in FIG. 11C, the pressure actuating ports 1160 are spaced approximately every inch along a radially extending face of the housing. One anti-rotation element 1170 is employed in the example depicted in FIG. 11C, although more or fewer anti-rotation elements 1170 may be used, depending on the application.

Figure 12:
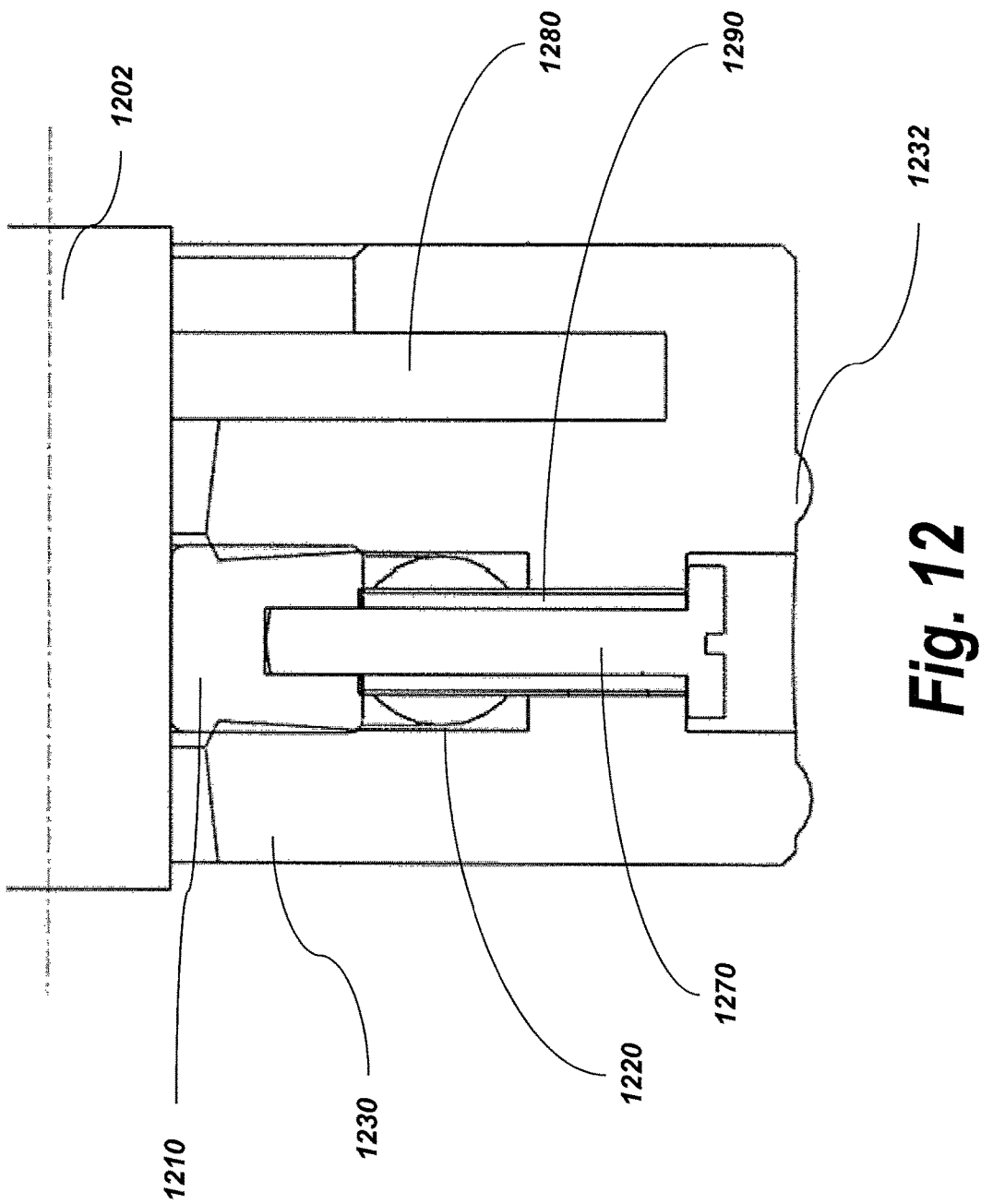
FIG. 12 is a cross-sectional view of a matrix split rotary seal having a sleeve, an anti-rotational screw, and a fluid leakage collecting channel according to a sixth embodiment of the invention.

A sixth embodiment of the invention employing a fluid leakage collecting channel and a sleeve is shown in FIG. 12. As shown in FIG. 12, a rotating shaft 1202 effects a seal with a radially inner surface of a matrix 1210. The matrix 1210 is energized by an energizer 1220, and the matrix 1210 and energizer 1220 are provided in a housing 1230. A static sealing surface 1232 is formed on a radially outward side of the housing 1230 and effects a seal with a static component.

In some embodiments, a fluid leakage collecting channel 1280 may serve as a gutter for collecting expelled fluid in a separate vessel. The channel scavenges any leakage from the interface between the matrix and shaft. The size of the collecting channel can be small relative to the size or the matrix seal footprint. The fluid leakage collecting channel 1280 may be formed directly in the housing 1230.

The anti-rotational element 1270 and the matrix 1210 may be allowed to move radially inwardly and outwardly, because the thru-hole in the housing 1230 may allow movement of the screw. A sleeve 1290 cut to an appropriate depth that spans from the countersink hole to the outside diameter of the matrix in the housing 1230 may control the amount the anti-rotational element 1270 enters into the matrix 1210. The anti-rotational element 1270 and sleeve 1290 may be made out of plastic materials to reduce any adverse effects if contact is made with the rotating shaft 1202.

Figure 13:
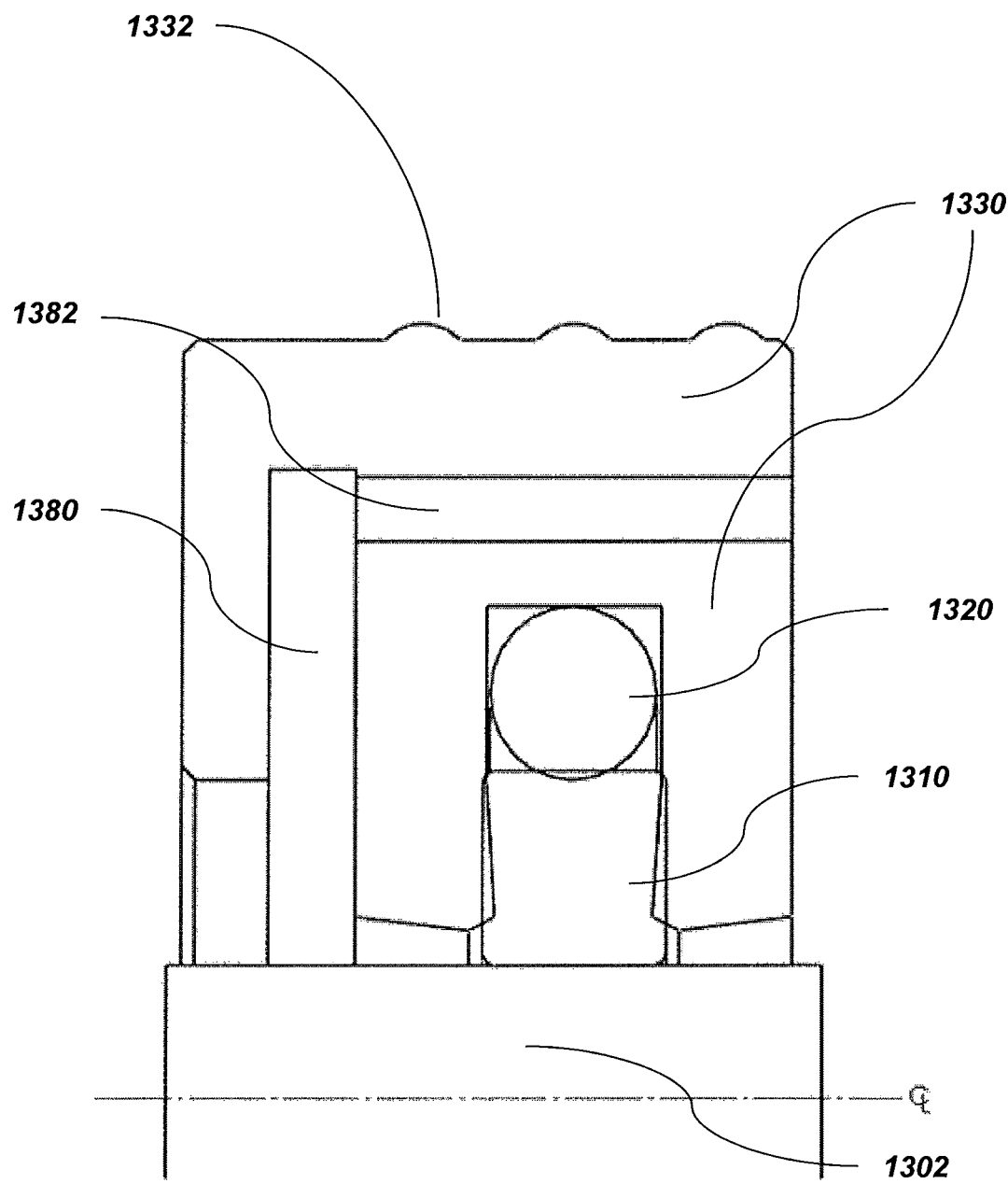
FIG. 13 is a cross sectional view of a matrix split rotary seal according to seventh embodiment of the invention.

FIG. 13 is a cross sectional view of a matrix split rotary seal according to seventh embodiment of the invention. As shown in FIG. 13, a rotating shaft 1302 effects a seal with a radially inner surface of a matrix 1310. The matrix 1310 is energized by an energizer 1320, and the matrix 1310 and energizer 1320 are provided in a housing 1330. A static sealing surface 1332 is formed on a radially outward side of the housing 1330 and effects a seal with a static component.

A fluid leakage collecting channel 1380 connects to a fluid leakage discharge channel 1382 formed in the housing 1330. The channel 1382 is positioned at the 6 o'clock position in the installation. This allows fluid collected in the channel housing 1330 to move due to gravity down flow out through channel 1382. Electively, a reservoir can be used to collect effluent as opposed to discharging in an uncontrolled manner.

Figure 14:
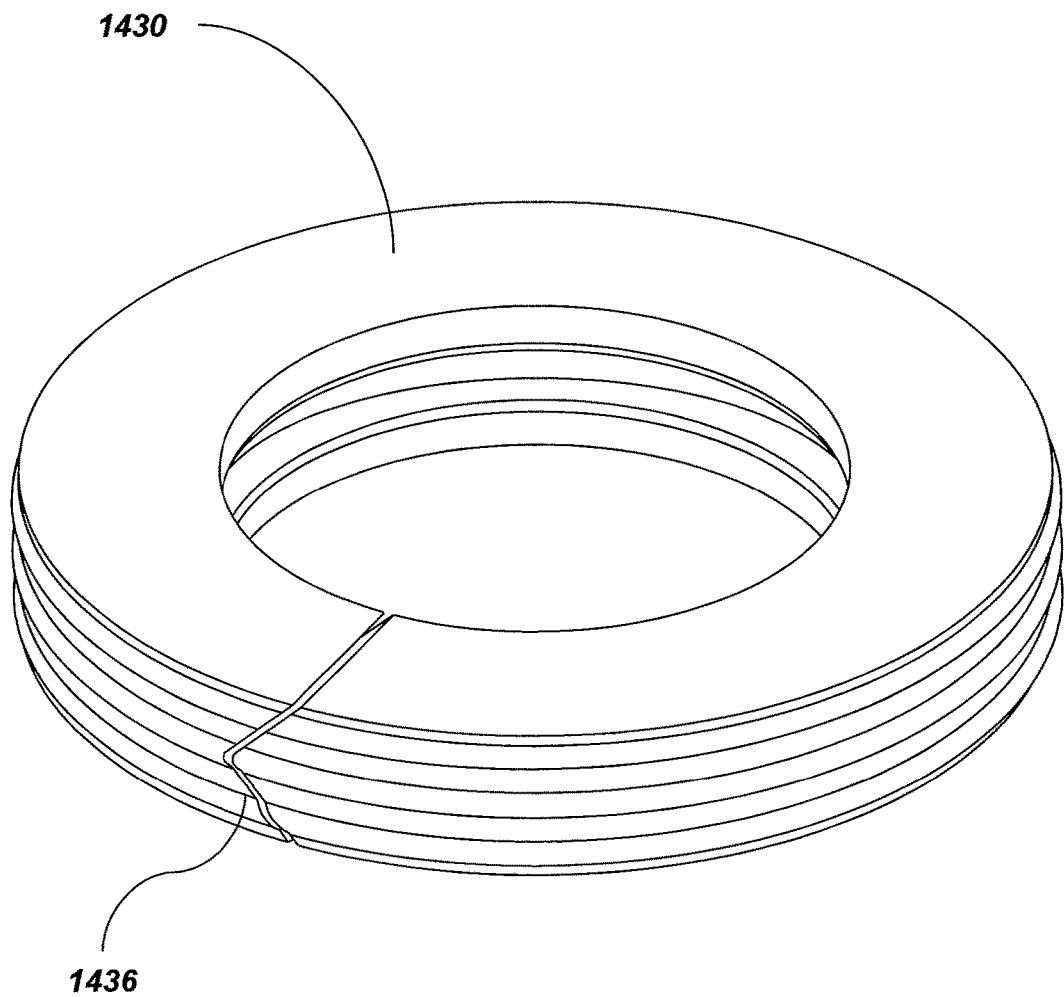
FIG. 14 is a perspective view of a matrix split rotary seal having a split in the form of a "V" cut.
Figure 15:
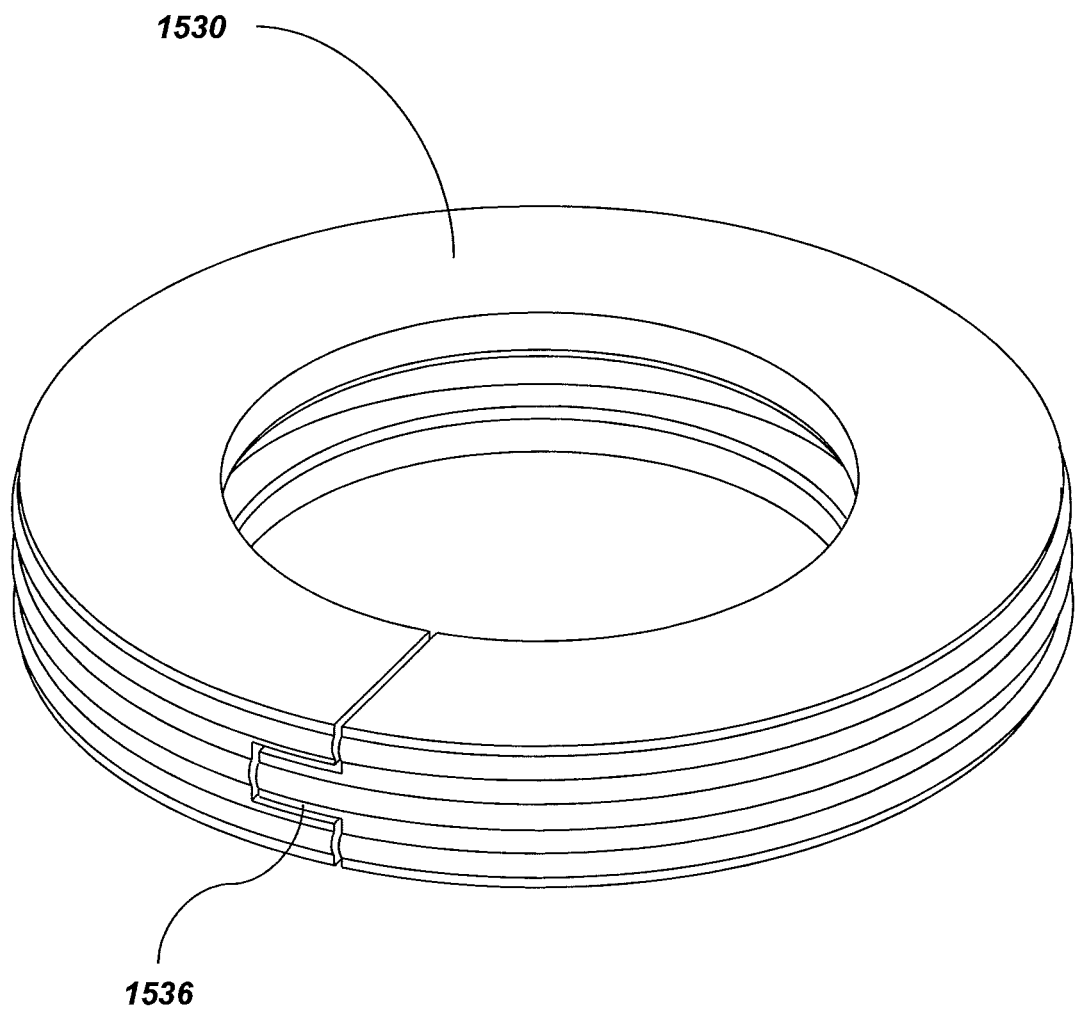
FIG. 15 is a perspective view of a matrix split rotary seal having a split in the form of a keyway split or block intercut.
Figure 16:
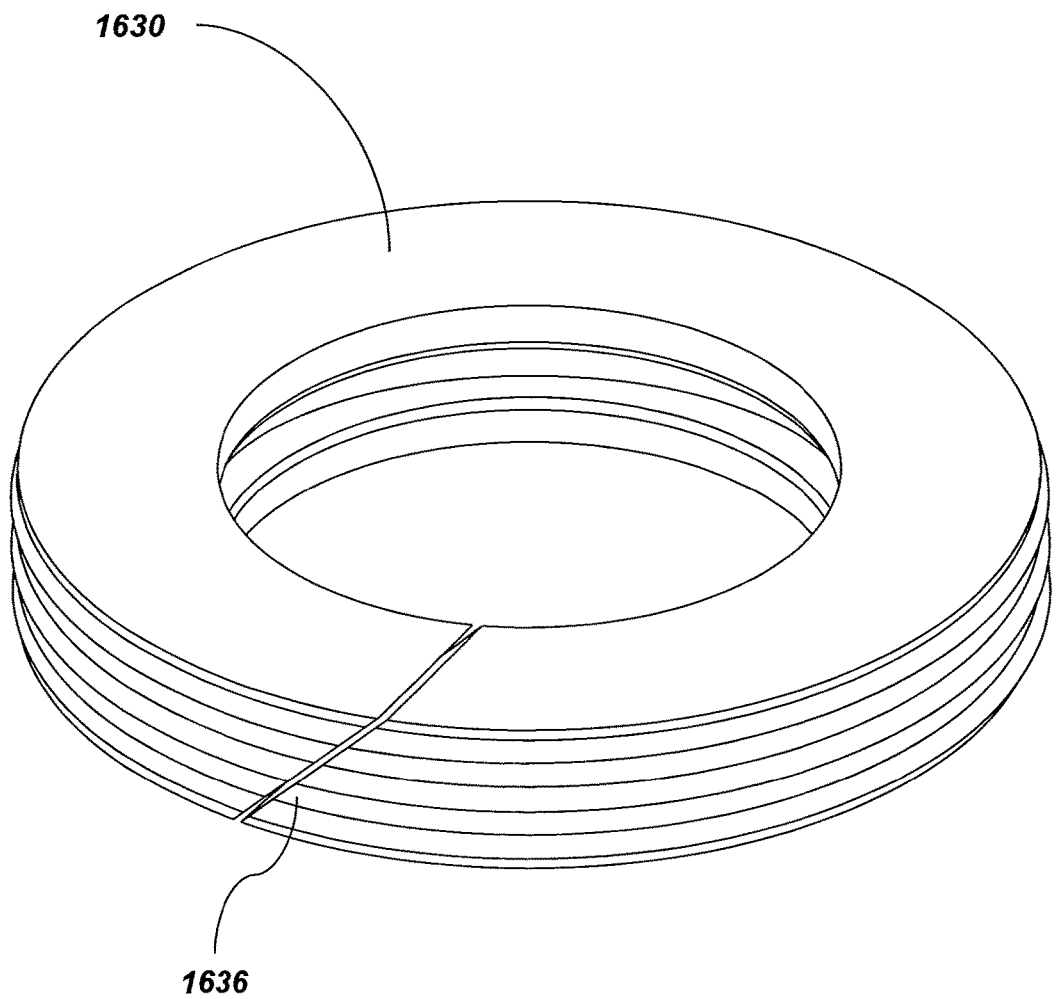
FIG. 16 is a perspective view of a matrix split rotary seal having a split in the form of a skieve cut.

FIGS. 14-16 depict different types of splits which may be employed in exemplary embodiments of the present invention. Different types of splits can be achieved using manufacturing techniques known in the art. A split configuration provides ease of installation; however, a solid unitary seal without a split may also be provided in some embodiments without deviating from the spirit of the invention.

The housing, energizer, and sealing element (e.g., a matrix) may be split in an interlocking fashion with a radial configuration. For example, FIG. 14 is a perspective view of a matrix split rotary seal having a housing 1430 that is split 1436 in the form of a "V" cut. FIG. 15 is a perspective view of a matrix split rotary seal having a housing 1530 that is split 1536 in the form of a keyway split or block intercut. An interlocking split like the ones in FIGS. 14-15 serves to lock two ends of the seal within an equipment bore, preventing misalignment. Once the annular matrix rotary seal assembly is introduced into the annular equipment configuration, the seal is locked and compressed. For example, the two ends may be pressed together.

As an alternative to an interlocking design, the housing, energizer, and sealing element (e.g., a matrix) may be split by a butt or skieve geometry. For example, FIG. 16 is a perspective view of a matrix split rotary seal having a housing 1630 that is split 1636 in the form of a skieve cut. A skieve cut 1636 has the advantage of allowing system pressure to enhance sealing at the interface in the axial direction.

Figure 17:
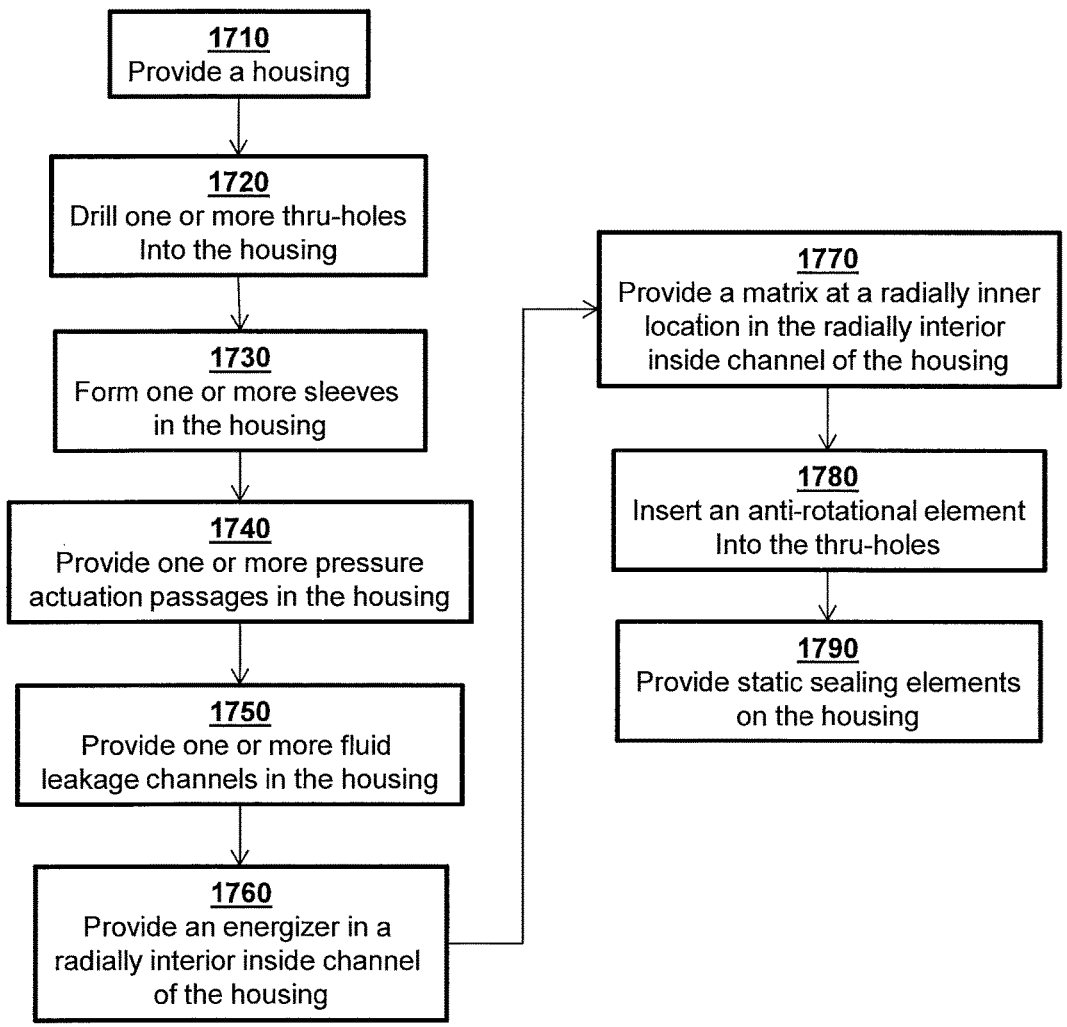
FIG. 17 is a flowchart depicting a method of fabricating a matrix split rotary seal according to the present invention.

FIG. 17 is a flowchart depicting an exemplary method for manufacturing a matrix split rotary seal according to an exemplary embodiment of the invention. The steps described below are exemplary only, and need not be performed in the same order described.

At step 1710 a housing is provided. The housing may be formed from elastomer, plastic, polyeurethane, or metal, and may be fabricated according to any method suitable for forming the selected material. The housing may be split.

The housing may include a radially interior inside channel, which may be defined (in part) by an interior axially extending wall. In addition to the interior axially extending wall, the radially interior inside channel may also include two interior substantially radially extending walls.

At a radially interior end of the housing, a radially inner first slanted wall may be formed. The first slanted wall may extend from one of the interior substantially radially extending walls to a meeting point, and a radially inner second slanted wall may extends from the meeting point to a radially extending exterior wall of the housing. The radially inner first slanted wall and the radially inner second slanted wall being slanted away from the axial direction at different angles.

At step 1720, one or more thru-holes may be drilled into the housing for seating one or more anti-rotational elements. The thru-holes need not necessarily be drilled, but may be provided using any means for creating a hole in the material selected for the housing. The thru-holes may be drilled in a radial direction from a radially outer end of the housing At step 1730, one or more sleeves may be formed in the housing. The sleeves may allow the anti-rotational elements inserted into the thru-holes to move radially inwardly and outwardly during operation of the mechanical seal. The sleeves may be shaped to accommodate the anti-rotational elements.

At step 1740, one or more pressure actuation passages may be drilled into a radially extending side of the housing. The pressure actuation passages need not necessarily be drilled, but may be provided using any means for creating a hole in the material selected for the housing. The pressure actuation passages may be drilled in an axial direction from one axial end of the housing into the radially interior inside channel of the housing at a location radially lateral to the location where the energizer will be provided (see step 1760). The pressure actuation passages may be provided at regular intervals along the radially-extending side of the housing, for example every inch along the circumference of the annular seal.

At step 1750, one or more fluid leakage collecting channels and fluid leakage discharge channels may be formed in the housing. The collecting channels would be annular configurations that are adjacent to the matrix. Collecting channels are made to be integral with the housing and can be of any geometry, rectangular being the most basic.

At step 1760, an energizer for providing a radial force to a matrix is positioned in the radially interior inside channel of the housing. The energizer may be made up of elastomer, foam, silicone, fluorocarbons, ethylene propylene diene Monomer (M-class) rubber (EPDM), nytrile, a sponge, or a metallic spring. The particular type, shape, and size of the energizer may be selected so that the energizer has a resistive force of 0.5-10 lbs/in. The energizer may be split, and may be in the form of a cord.

At step 1770 a matrix is provided substantially within the radially interior inside channel of the housing. The matrix may be formed of composite reinforced fibers or yarns and one or more lubricants. The fibers or yarns may be braided or woven in a textile fashion. The fibers may be carbon, aramid, rayon, kynol, Kevlar, cotton, or polytetrafluoroethylene (PTFE) fibers, or a combination. The lubricants may include carbon, graphite, and PTFE based lubricants.

The matrix may be configured and positioned such that the matrix (when deployed in conjunction with an energizer) protrudes from the radially interior inside channel. The matrix may have a radially inner surface for sealing against the equipment. The matrix may be positioned such that the energizer is disposed between the matrix and the interior axially extending wall in the radial direction. The matrix may be split, and may be in the form of a cord.

The matrix may be selected so that the matrix has an inner diameter and the housing has an inner diameter defined at the radially innermost point of the housing, and the inner diameter of the matrix is less than the inner diameter of the housing. The matrix may also be selected to be more rigid than the energizer.

At step 1780, one or more anti-rotational elements may be inserted into the through-holes and pushed through the energizer and at least a part of the matrix. The anti-rotational elements may be screws or pins, and may be formed, for example, from plastic.

At step 1790, one or more static sealing elements may be provided on a radially outer surface of the housing. The static sealing elements may be formed integrally with the housing. Alternatively, a radially exterior outside channel may be formed in the housing, and a non-integral static sealing element, such as an o-ring, may be provided in the radially exterior outside channel. If one or more thru-holes and anti-rotational elements were provided at step 1780, the sealing elements may be provided so as to cover a proximal end of the anti-rotational elements.

Figure 18A:
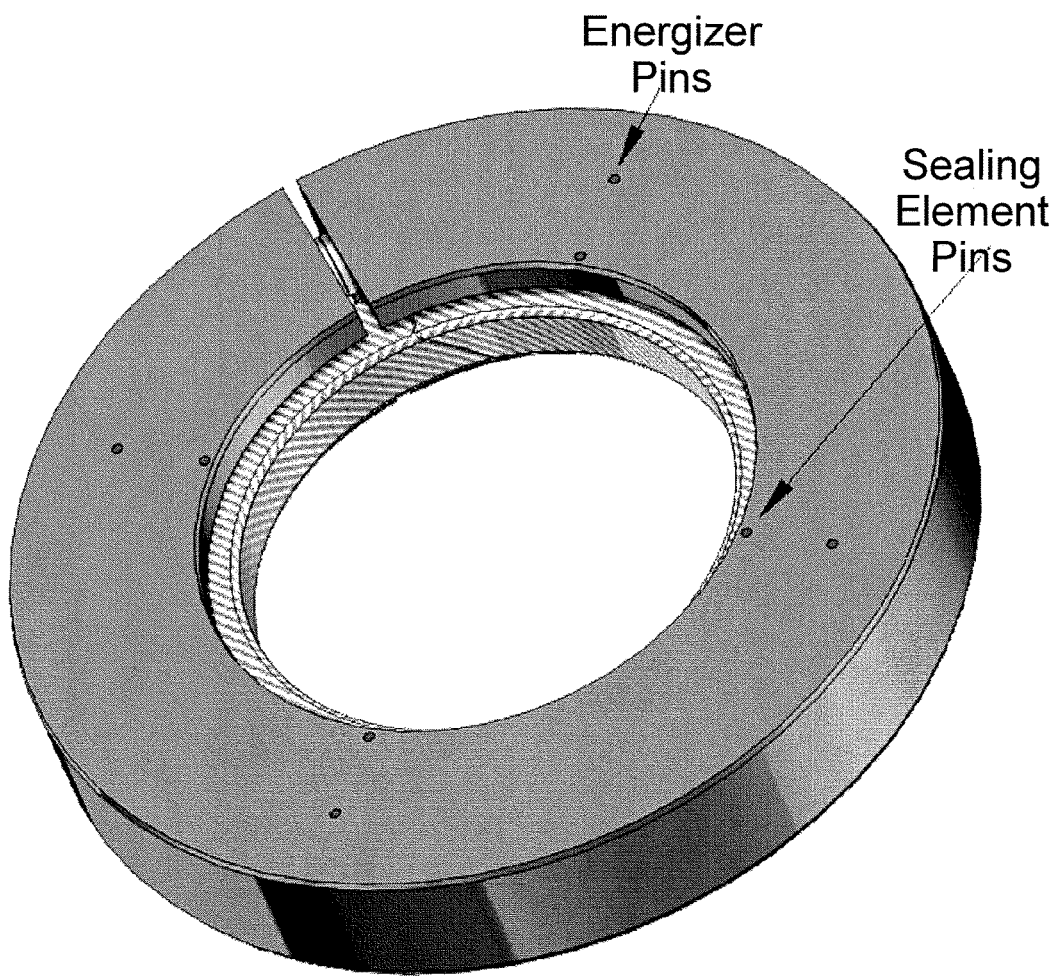
FIGS. 18A-18E depict alternative views of a matrix split rotary seal employing axially-extending anti-rotational elements in accordance with another embodiment of the invention.
Figure 18B:
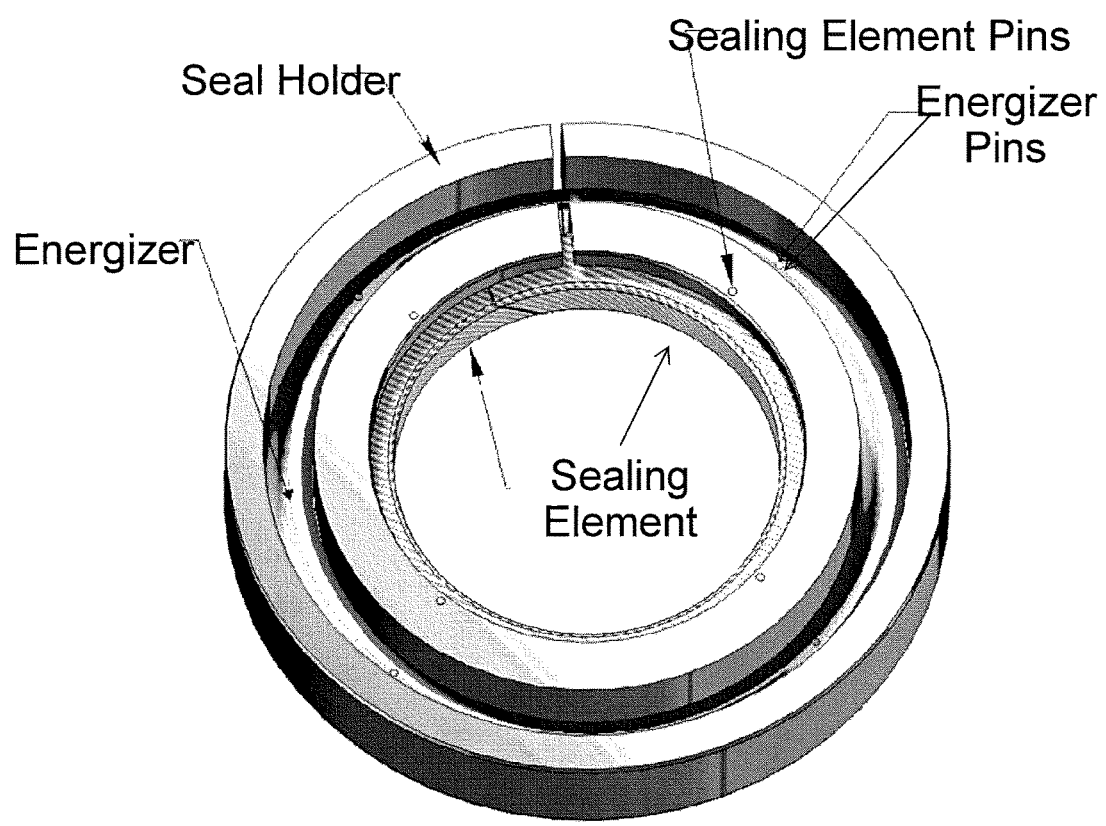
Figure 18C:
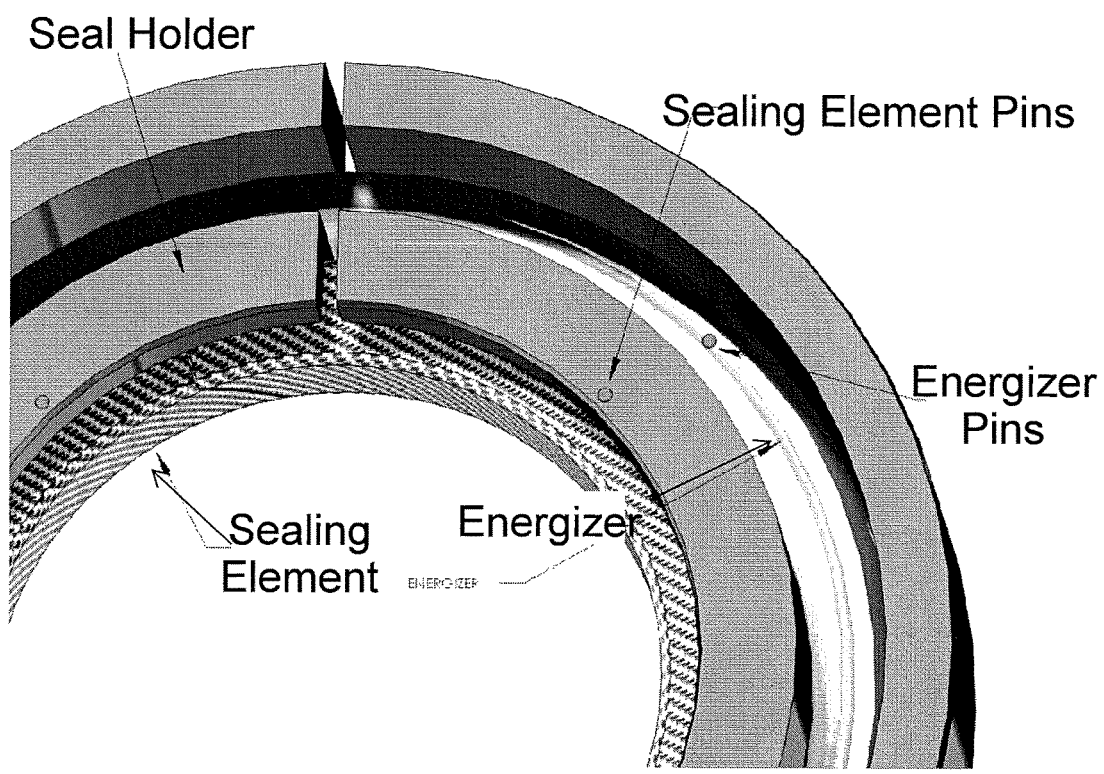
Figure 18D:
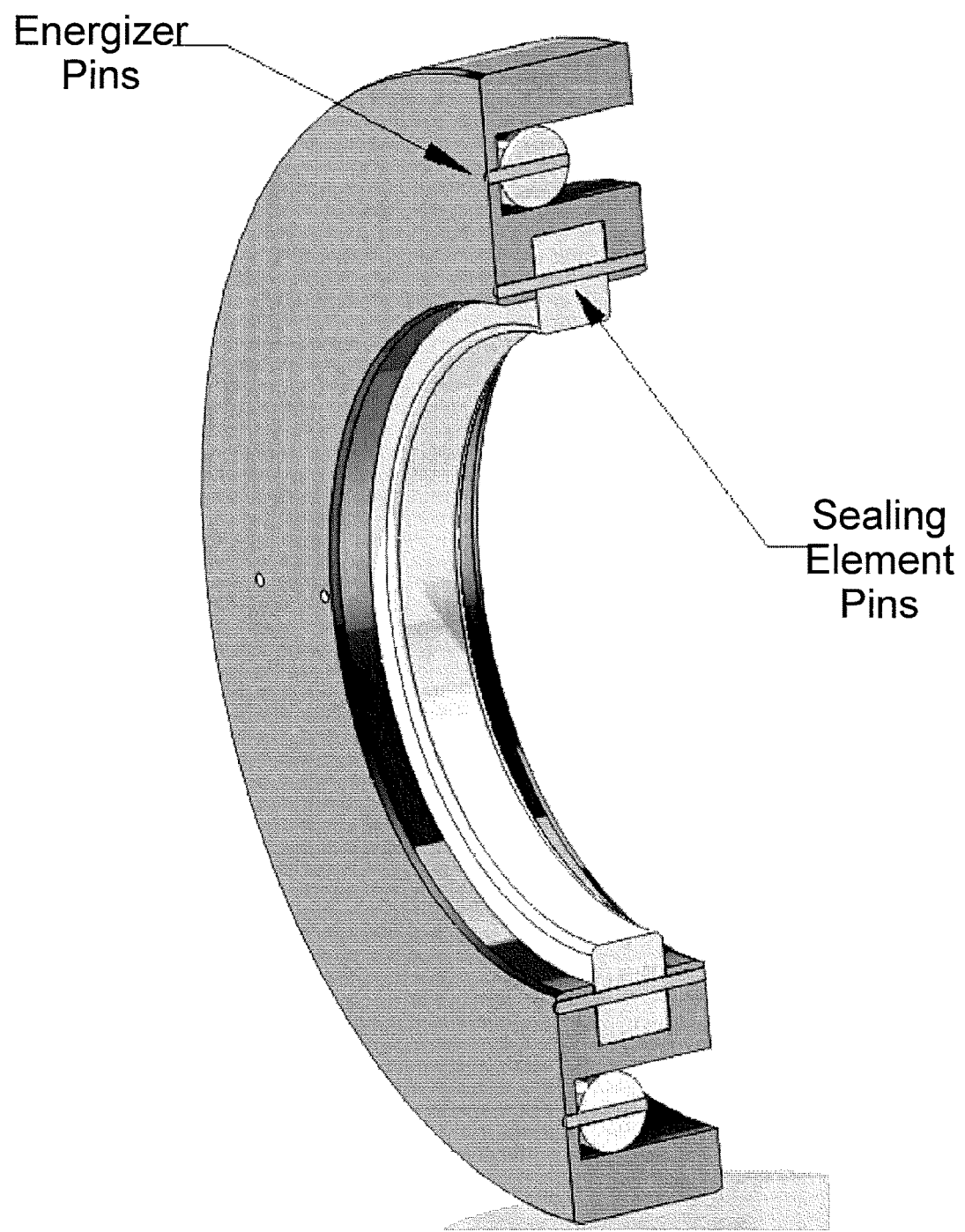
Figure 18E:
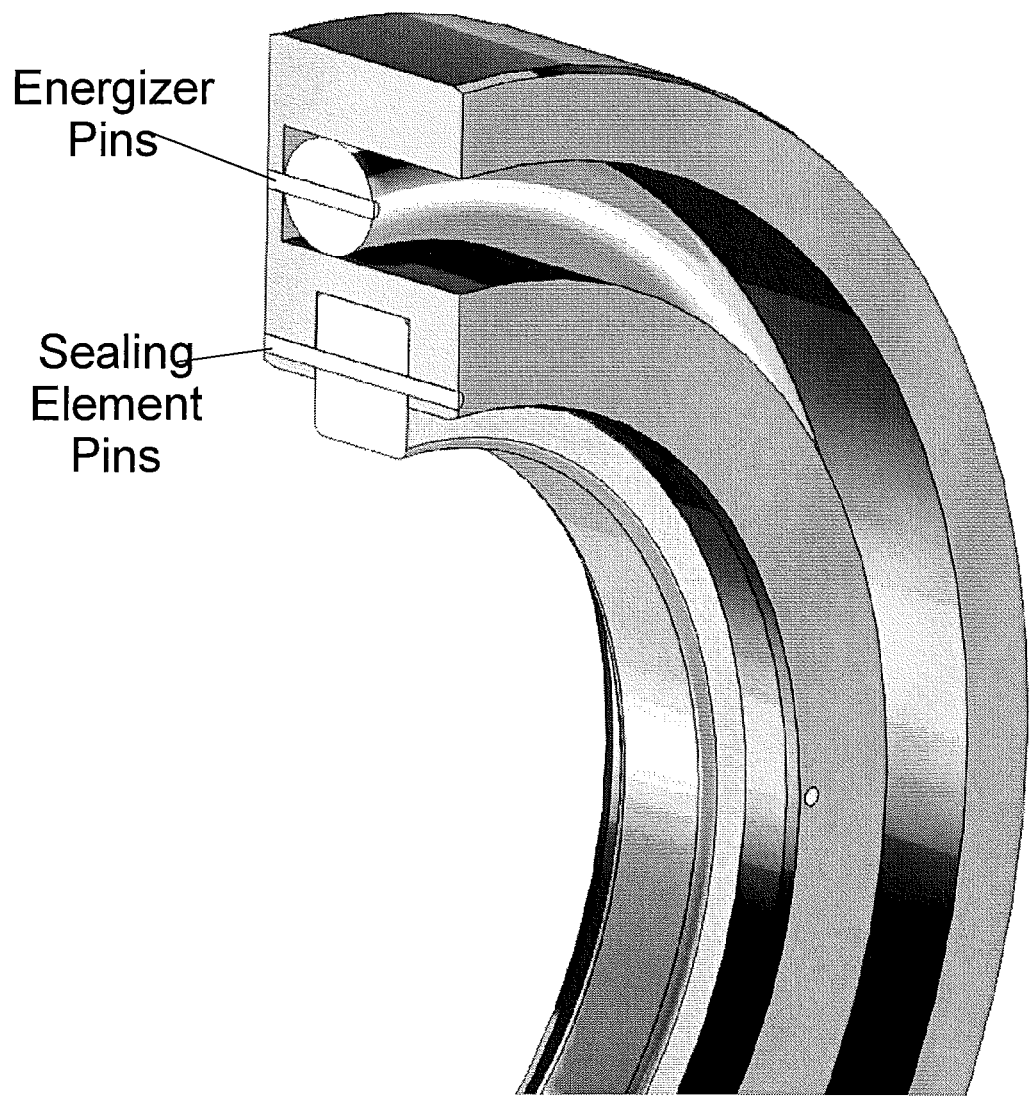

FIGS. 18A-18E depict another embodiment of the present invention. In this embodiment, multiple anti-rotational elements are present. FIG. 18A is a perspective view of the seal assembly from a first side, while FIG. 18B is a perspective view of the seal assembly from a second side opposite the first side. FIGS. 18C and 18D are close-up views of the second side of the seal assembly. FIG. 18E is a cross-sectional view of the seal assembly.

In the embodiment of FIGS. 18A-18E, a first set of anti-rotational elements (energizer pins, in one embodiment) may extend through the housing and the energizer of the seal assembly at one or more locations along a circumference at a radial distance $r_1$ from the center of the shaft so as to extend through the energizer substantially at the center of the energizer. A second set of anti-rotational elements (sealing element pins, in one embodiment) may extend through the housing and the matrix of the seal assembly at one or more locations along a circumference at a radial distance $r_2$ from the center of the shaft so as to extend through the matrix substantially at the center of the matrix.

It should be noted that the anti-rotational elements need not extend through the energizer or the matrix at precisely the center, and in other embodiments one or more pins may be provided which pass through each of these elements at the center and/or at locations offset from the center of these elements.

In view of the above, it will be seen that the invention efficiently attains the objects set forth above, among those made apparent from the preceding description. Since certain changes may be made in the above constructions without departing from the scope of the invention, it is intended that all matter contained in the above description or shown in the accompanying drawings be interpreted as illustrative and not in a limiting sense.

It is also to be understood that the following claims are to cover all generic and specific features of the invention described herein, and all statements of the scope of the invention which, as a matter of language, might be said to fall therebetween.

Having described the invention, what is claimed as new and desired to be secured by Letters Patent is:

1. An annular mechanical seal assembly for sealing around equipment extending in an axial direction, wherein a radial direction extends outward from the equipment perpendicular to the axial direction, the seal assembly comprising:
a housing having a radially outermost axially extending surface and an opposed radially innermost axially extending surface, wherein the housing has formed in the radially innermost axially extending surface a single radially extending channel, the radially extending channel defined in part by an interior axially extending wall and first and second opposed radially extending walls denoting first and second radially extending arm portions formed on opposite sides of the channel and which form part of the housing, wherein each of the first and second radially extending arm portions have formed on a radially innermost axially extending surface a radially inner first flat slanted wall extending from one of the first or second radially extending walls of the channel to a meeting point, and a radially inner second flat slanted wall extending from the meeting point to a radially extending exterior wall of the housing, wherein the housing is symmetrical about a radially extending centerline and the first and second slanted flat walls are separate and distinct from the walls forming the channel,
wherein the radially inner first flat slanted wall and the radially inner second flat slanted wall are slanted at different angles;
a matrix sealing element provided substantially within the radially interior inside channel of the housing and protruding from the radially interior inside channel, the matrix sealing element having a radially inner surface for sealing against the equipment; and
an energizer biasing element for providing a radial force to the matrix, the energizer disposed in the radially interior inside channel of the housing between the matrix and the interior axially extending wall in the radial direction, and wherein the energizer biasing element is less rigid than the matrix sealing element,
wherein the energizer biasing element contacts the matrix, the interior axially extending wall, and the interior walls of the radially interior inside channel, and
wherein the matrix sealing element comprises composite reinforced fibers and at least one lubricant.

2. The seal assembly of claim 1, wherein the housing is formed from elastomer, plastic, polyeurethane, or metal.

3. The seal assembly of claim 1, wherein the housing further comprises one or more static sealing elements provided on the radially outermost axially extending surface of the housing.

4. The seal assembly of claim 3, wherein the one or more static sealing elements are integral with the radially outermost axially extending surface of the housing.

5. The seal assembly of claim 3, wherein at least one of the static sealing elements is provided in a radially exterior outside channel of the housing.

6. The seal assembly of claim 5, wherein the at least one of the static sealing elements is an O-ring.

7. The seal assembly of claim 1, wherein the fibers comprise carbon, aramid, rayon, kynol, Kevlar, cotton, and polytetrafluoroethylene (PTFE) fibers.

8. The seal assembly of claim 1, wherein the fibers are woven or braided.

9. The seal assembly of claim 1, wherein the one or more lubricants comprise carbon, graphite, and PTFE.

10. The seal assembly of claim 1, wherein the matrix sealing element has an inner diameter and the housing has an inner diameter defined at the radially innermost point of the housing, and the inner diameter of the matrix is less than the inner diameter of the housing.

11. The seal assembly of claim 1, wherein the energizer biasing element comprises elastomer, foam, silicone, fluorocarbons, ethylene propylene diene Monomer (M-class) rubber (EPDM), nytrile, a sponge, or a metallic spring.

12. The seal assembly of claim 1, wherein the energizer biasing element has a resistive force of 0.5-10 lbs/in.

13. The seal assembly of claim 1, wherein one or more of the housing, the matrix and the energizer have two ends and comprise a split separating the two ends.

14. The seal assembly of claim 1, wherein at least one of the energizer and the matrix is in the form of a cord.

15. The seal assembly of claim 1, further comprising a pressure actuation passage for introducing a process fluid at a higher than ambient pressure for energizing the matrix.

16. The seal assembly of claim 1, further comprising an anti-rotational element for preventing the matrix from rotating, the anti-rotational element extending through the housing and energizer and into the matrix.

17. The seal assembly of claim 16, wherein the anti-rotational element is a pin or a screw inserted through the housing in a radial direction.

18. The seal assembly of claim 16, wherein a thru-hole in the housing permits radial movement of the anti-rotational element.

19. The seal assembly of claim 16, further comprising a sleeve formed in the housing for controlling an amount the anti-rotational element enters into the matrix.

20. The seal assembly of claim 1, further comprising a fluid leakage collecting channel for collecting fluid from the equipment.

21. A method of fabricating a mechanical seal assembly for sealing around equipment extending in an axial direction, wherein a radial direction extends outward from the equipment perpendicular to the axial direction, the method comprising:

providing a housing having a radially outermost axially extending surface and an opposed radially innermost axially extending surface, wherein the housing has formed in the radially innermost axially extending surface a radially extending channel, the radially extending channel defined in part by an interior axially extending wall and first and second opposed radially extending walls denoting first and second radially extending arm portions formed on opposite sides of the channel and which form part of the housing, wherein each of the first and second radially extending arm portions have formed on a radially innermost axially extending surface a radially inner first flat slanted wall extending from one of the first or second radially extending walls of the channel to a meeting point, and a radially inner second flat slanted wall extending from the meeting point to a radially extending exterior wall of the housing, wherein the housing is symmetrical about a radially extending centerline and the first and second flat slanted walls are separate and distinct from the walls forming the channel, wherein the radially inner first flat slanted wall and the radially inner second flat slanted wall are slanted at different angles;

providing a matrix sealing element substantially within the radially interior inside channel of the housing and protruding from the radially interior inside channel, the matrix sealing element having a radially inner surface for sealing against and conforming to the equipment; and disposing an energizer biasing element for providing a radial force to the matrix in the radially interior inside channel of the housing between the matrix and the interior axially extending wall in the radial direction, and wherein the energizer biasing element is less rigid than the matrix sealing element, wherein the energizer contacts the matrix, the interior axially extending wall, and the interior walls of the radially interior inside channel, and wherein the matrix sealing element comprises composite reinforced fibers and at least one lubricant.

22. The method of claim 21, wherein the housing is formed from elastomer, plastic, polyurethane, or metal.

23. The method of claim 21, wherein the housing further comprises one or more static sealing elements provided on the radially outermost axially extending surface of the housing.

24. The method of claim 23, wherein at least one of the static sealing elements is provided in a radially exterior outside channel of the housing.

25. The method of claim 21, wherein the fibers comprise carbon, aramid, rayon, kynol, Kevlar, cotton, and polytetrafluoroethylene (PTFE) fibers.

26. The method of claim 21, wherein the fibers are woven or braided.

27. The method of claim 21, wherein the one or more lubricants comprise carbon, graphite, and PTFE.

28. The method of claim 21, wherein the matrix sealing element has an inner diameter and the housing has an inner diameter defined at the radially innermost point of the housing, and the inner diameter of the matrix is less than the inner diameter of the housing.

29. The method of claim 21, wherein the energizer biasing element comprises elastomer, foam, silicone, fluorocarbons, ethylene propylene diene Monomer (M-class) rubber (EPDM), nytrile, a sponge, or a metallic spring.

30. The method of claim 21, wherein the energizer has a resistive force of 0.5-10 lbs/in.

31. The method of claim 21, wherein one or more of the housing, the matrix and the energizer have two ends and comprise a split separating the two ends.

32. The method of claim 21, wherein at least one of the energizer and the matrix is in the form of a cord.

33. The method of claim 21, further comprising providing a pressure actuation passage in the housing alongside the energizer.

34. The method of claim 21, further comprising providing an anti-rotational element for preventing the matrix from rotating, the anti-rotational element extending through the housing and energizer and into the matrix.

35. The method of claim 34, wherein the anti-rotational element is a pin or a screw inserted through the housing in a radial direction.

36. The method of claim 34, further comprising providing a thru-hole in the housing that permits radial movement of the anti-rotational element.

37. The method of claim 34, further comprising providing a sleeve formed in the housing for controlling an amount the anti-rotational element enters into the matrix.

38. The method of claim 21, further comprising providing a fluid leakage collecting channel for collecting fluid from the equipment.

39. The seal assembly of claim 1, wherein the first and second opposed radially extending walls of the channel are slanted relative to each other to form a taper.

* * * * *